United States Patent
Malek Mohammadi et al.

(10) Patent No.: US 12,015,458 B2
(45) Date of Patent: Jun. 18, 2024

(54) TECHNIQUE FOR PRECODING A RADIO TRANSMISSION

(71) Applicant: Telefonaktiebolaget LM Ericsson (publ), Stockholm (SE)

(72) Inventors: Mohammadreza Malek Mohammadi, Solna (SE); Karl Werner, Segeltorp (SE); Niklas Jaldén, Enköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 169 days.

(21) Appl. No.: 17/634,084

(22) PCT Filed: Aug. 9, 2019

(86) PCT No.: PCT/EP2019/071405
§ 371 (c)(1),
(2) Date: Feb. 9, 2022

(87) PCT Pub. No.: WO2021/028006
PCT Pub. Date: Feb. 18, 2021

(65) Prior Publication Data
US 2022/0352932 A1 Nov. 3, 2022

(51) Int. Cl.
*H04B 7/0456* (2017.01)
*H04B 7/06* (2006.01)

(52) U.S. Cl.
CPC ......... *H04B 7/0456* (2013.01); *H04B 7/0632* (2013.01)

(58) Field of Classification Search
CPC ...... H04B 7/0456; H04B 7/0632; H04B 7/06; H04B 7/04026
See application file for complete search history.

(56) References Cited

U.S. PATENT DOCUMENTS

| | | | |
|---|---|---|---|
| 2011/0128917 A1* | 6/2011 | Ko | H04B 7/0413 370/328 |
| 2014/0321569 A1* | 10/2014 | Kim | H04B 7/0417 375/267 |
| 2014/0362787 A1 | 12/2014 | Mobasher et al. | |

(Continued)

OTHER PUBLICATIONS

3GPP, "3rd Generation Partnership Project; Technical Specification Group Radio Access Network; NR; Physical layer procedures for data (Release 15)", 3GPP TS 38.214 V15.5.0, Mar. 2019, 1-103.

(Continued)

*Primary Examiner* — Aristocratis Fotakis
(74) *Attorney, Agent, or Firm* — Murphy, Bilak & Homiller, PLLC

(57) ABSTRACT

A technique for transmitting on a multiple-input channel from a transmitting device to at least one receiving device is described. As to a method of the technique, a quality of a channel estimate of the multiple-input channel from the transmitting device to the at least one receiving device is determined. A transmission on the multiple-input channel from the transmitting device to the at least one receiving device is performed. The transmission is spatially precoded using at least one precoder determined out of a set of precoders. A size of the set of precoders is an increasing or non-decreasing function of the determined quality of the channel estimate.

19 Claims, 10 Drawing Sheets

(56) References Cited

U.S. PATENT DOCUMENTS

| | | | | |
|---|---|---|---|---|
| 2016/0028453 | A1* | 1/2016 | Zhou | H04L 1/0606 |
| | | | | 375/267 |
| 2016/0329942 | A1* | 11/2016 | Zhu | H04B 7/0417 |
| 2017/0085302 | A1* | 3/2017 | Tong | H04B 7/0478 |
| 2018/0006700 | A1* | 1/2018 | Frenne | H04B 7/0626 |
| 2018/0115381 | A1 | 4/2018 | Lincoln et al. | |
| 2018/0131423 | A1* | 5/2018 | Park | H04B 7/0456 |
| 2018/0138954 | A1* | 5/2018 | Gao | H04B 7/0473 |
| 2020/0195312 | A1* | 6/2020 | Wu | H04W 72/0453 |
| 2020/0343948 | A1* | 10/2020 | Shaban | H04B 7/0456 |

OTHER PUBLICATIONS

Lee, Frederick K.H., et al., "Adaptive vs. Diversity Transmission for Multiuser MISO Systems with Imperfect CSIT", 2007 IEEE International Conference on Communications, Glasgow, Scotland, 2007, 897-901.

\* cited by examiner

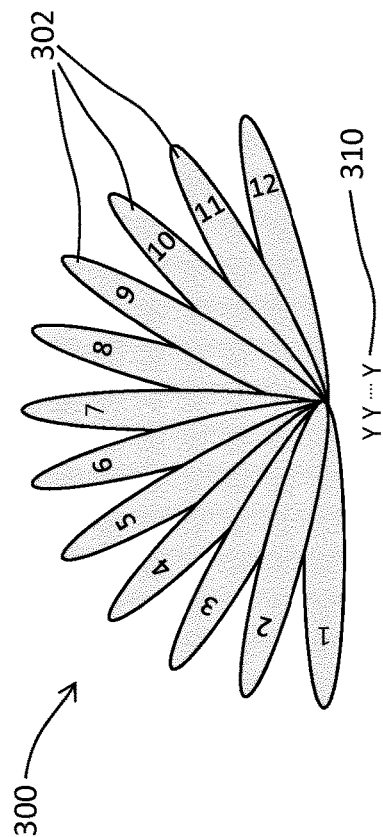
Fig. 3
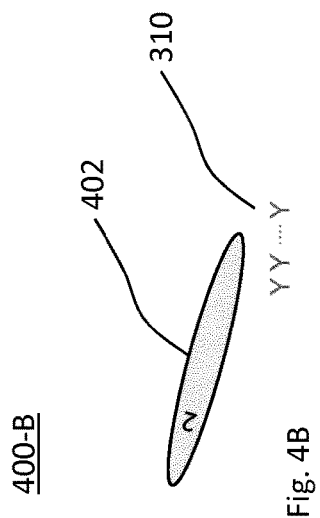
Fig. 4B
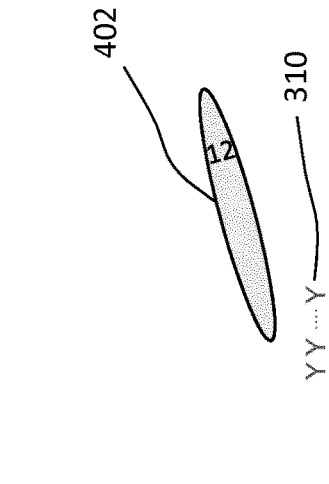
Fig. 4D
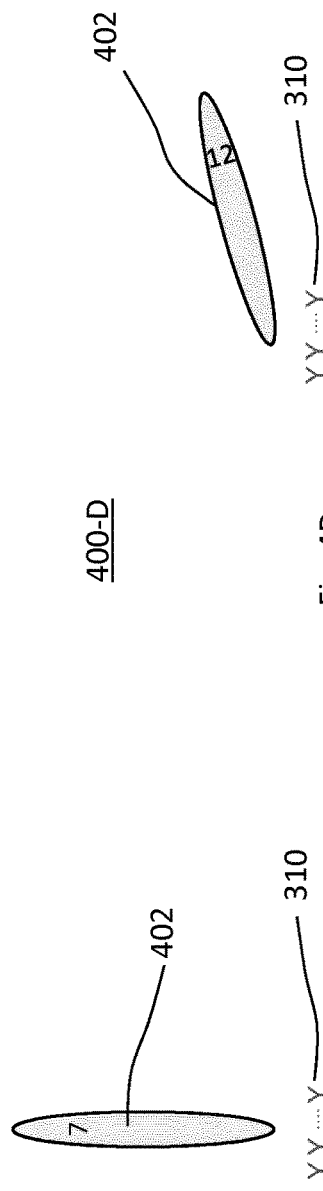
Fig. 4A
Fig. 4C

1000

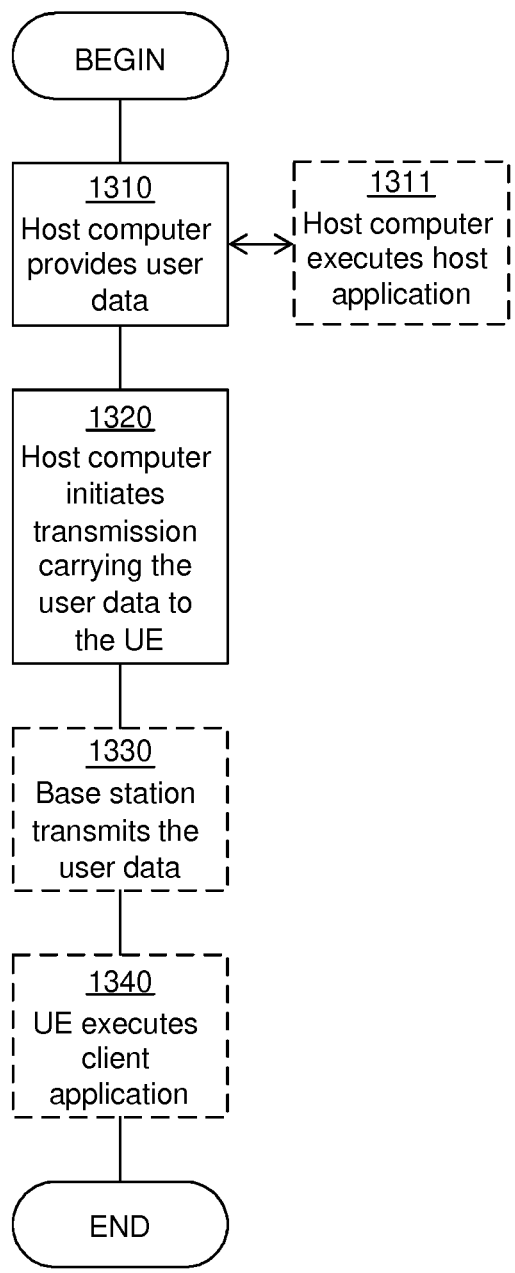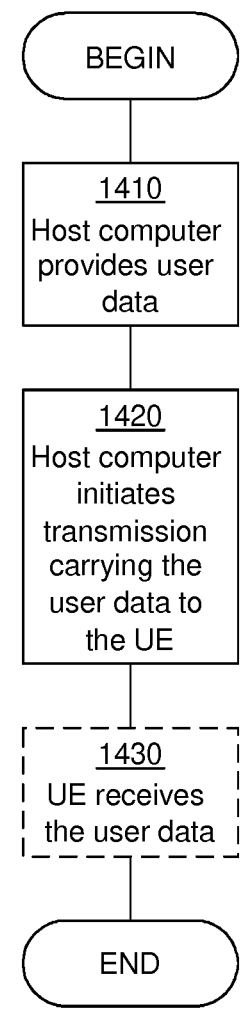
Fig. 13
Fig. 14

TECHNIQUE FOR PRECODING A RADIO TRANSMISSION

TECHNICAL FIELD

The present disclosure relates to precoding a multiple-input transmission. More specifically, and without limitation, a method and a device for transmitting on a multiple-input channel to at least one receiving device are provided.

BACKGROUND

As one example of transmitting on a multiple-input channel, a multi-user multiple-input multiple-output (MU-MIMO) transmission of a base station serves multiple radio devices (and, thus, potentially multiple users) simultaneously with the same time and frequency resources in a radio access network (RAN), e.g., according to the Third Generation Partnership Project (3GPP). The MU-MIMO channel, for which the base station and optionally the radio devices are equipped with multiple antenna elements, allows for spatial diversity in the transmission of data. More generally, spatial diversity is achievable in a wireless communication network by transmitting on a multiple-input channel, e.g., in uplink (UL) and/or downlink (DL) directions of the RAN and/or in sidelink (SL) directions of an ad hoc network.

The spatial diversity can increase the capacity of the wireless communication network, i.e., the frequency spectrum can be used more efficiently. Moreover, the transmission on the multiple-input channel (e.g., the MU-MIMO channel) can reduce inter-cell interference, i.e. interference caused at a radio device by another base station, which in turn enables a denser frequency re-use. As the electromagnetic spectrum is a rare resource, the transmission on the multiple-input channel (e.g., the MU-MIMO channel) can extend the capacity of wireless communication systems.

Frederick K. H. Lee et al. suggest in the document "Adaptive vs. Diversity Transmission for Multiuser MISO Systems with Imperfect CSIT" for the 2007 IEEE International Conference on Communications switching to diversity transmission techniques such as space-time coding and frequency interleaving when the quality of a channel state information at the transmitter (CSIT) is poor, because diversity transmission techniques are capable of capturing spatial and spectral diversity without CSIT.

However, such a selective usage of adaptive transmission techniques foregoes the increased channel capacity achievable in modern multi-antenna systems.

SUMMARY

Accordingly, there is a need for a radio transmission technique that increases channel capacity in at least some situations.

As to a method aspect, a method of transmitting on a multiple-input channel from a transmitting device to at least one receiving device is provided. The method comprises or initiates a step of determining a quality of a channel estimate of the multiple-input channel from the transmitting device to the at least one receiving device. The method further comprises or initiates a step of transmitting on the multiple-input channel from the transmitting device to the at least one receiving device. The transmission is spatially precoded using at least one precoder determined out of a set of precoders. A size of the set of precoders is an increasing or non-decreasing function of the determined quality of the channel estimate.

In at least some embodiments of the technique, the quality of the channel estimate may control the set of precoders. More specifically, the size of the set of precoders, which are available and/or used for determining the at least one precoder for the transmission, may be controlled by the quality of the channel estimate.

Since the size is an increasing or non-decreasing function of the determined quality of the channel estimate, same or further embodiments may restrict the set of precoders when the quality of the channel estimate is poor (e.g., below a predefined quality threshold value). The size of the set of precoders can be brought into agreement with the quality of the channel estimate used for determining the at least one precoder out of the set (i.e., within the set). By way of example, the increasing or non-decreasing function of the determined quality of the channel estimate may be indicative of an amount of reliable information (e.g., an information entropy) in the channel estimate, so that the channel estimate is sufficient to reliably determine the precoder within the set of precoders.

The technique may be implemented as a channel-quality-aware adaptive precoding. The multiple-input channel may be a multi-user multiple-input multiple output (MU-MIMO) channel. The spatial precoding may be based on channel reciprocity. The channel estimate may be determined using channel reciprocity.

Herein, the expression "channel estimate" may encompass a transfer function (also referred to as a channel response), e.g., for time-division duplexing (TDD) between transmitting and receiving devices, and/or a direction of arrival (DoA), e.g., for frequency-division duplexing (FDD) between transmitting and receiving devices. The at least one precoder may be determined (e.g., selected) out of the set using channel reciprocity, i.e., the at least one precoder may be determined out of the set based on the channel estimate, which is estimated using channel reciprocity. For example, the at least one precoder may be determined out of the set based on the transfer function and/or the DoA.

The reciprocity-based precoder may be calculated based on available channel information. Consequently, the size of the superset or the size of the unconstrained set may very large.

The quality of the channel estimate may be determined (e.g., computed and/or estimated) without and/or prior to determining the channel estimate, e.g., without and/or prior to performing a channel estimation that determines or results in the channel estimate.

The quality of the channel estimate may be a scalar value. The size of the set of precoders for a lesser quality of the channel estimate may be less than the size of the set of precoders for a greater quality of the channel estimate. That is, the size of the set of precoders for a greater quality of the channel estimate may be greater than the size of the set of precoders for a lesser quality of the channel estimate.

The size may be a monotonically increasing or non-decreasing function of the determined quality of the channel estimate.

An output of the at least one precoder may define the multiple inputs of the multiple-input channel. For example, the transmitting device may comprise an antenna array comprising multiple antenna elements and/or multiple antenna ports. Each of the antenna elements and/or antenna ports may correspond to one of the multiple inputs of the channel. The at least one precoder may map one or more layers (also: spatial streams) of the transmission to the multiple inputs of the multiple-input channel.

Each of the precoders in the set of precoders may correspond to a precoding vector comprising a complex gain for each of the multiple inputs of the multiple-input channel. The complex gains may be the components of the vector. Spatially precoding the transmission using the at least one precoder may comprise applying the complex gains of the used at least one precoder (i.e., the complex gains of the corresponding precoding vector) to the respective multiple inputs of the multiple-input channel.

The transmission to the at least one receiving device may be a data transmission and/or control transmission. In the transmission, signals (e.g., signals modulated based on a codeword) may be spatially precoded using the at least one precoder. The signals may comprise downlink (DL) signals, uplink (UL) signals and/or sidelink (SL) signals.

The signals may be transmitted by applying the at least one precoder determined out of the set of precoders to the signals (e.g., baseband signals for a baseband precoder or radio frequency signals for an analog precoder) resulting in precoded signals. The at least one precoder may map or convert the signals to the precoded signals. The precoded signals may be applied to the respective multiple inputs of the multiple-input channel, e.g., to the respective antenna elements and/or the respective antenna ports.

In the transmission, signals may be transmitted from the transmitting device to each of the at least one receiving device. The signals may be carry data (e.g., payload or user data) or control information (e.g., control signals).

The multiple-input channel may comprise at least one of a multiple-input single-output channel (MISO channel), e.g., for transmitting one layer to one receiving device; a multiple-input multiple-output channel (MIMO channel), e.g., for transmitting two or more layers to one receiving device; and a multi-user MIMO channel (MU-MIMO channel), e.g., for transmitting one or more layers to two or more receiving devices.

The set of precoders may comprise at least two precoders. The size of the set of precoders may correspond to the number of precoders in the set of precoders. For example, the size of the set of precoders may be the cardinality of the set of precoders.

Alternatively, or in addition, the size of the set of precoders may be the number of degrees of freedom in determining the at least one precoder out of the set of precoders. For example, different precoders in the set may correspond to different values of at least one precoding parameter. The size of the set of precoders may correspond to the number of the at least one precoding parameter. All the different precoders in the set may uniquely correspond to different values of at least one precoding parameter. The size of the set may correspond to the minimum number of the at least one precoding parameter necessary for uniquely identifying each of the precoders in the set. For example, the size may correspond to a dimension of a space of the at least one precoding parameter covering the set.

A phase difference between neighboring antenna elements may be an example for one of the precoding parameters. A polarization may be a further example for one of the precoding parameters.

The set may result from selectively restricting a superset of precoders according to a constraint depending on the determined quality of the channel estimate.

The precoder used in the transmission may be selectively unconstrained (e.g., determined from a second set or not restricted by the constraint) and constrained (e.g., determined from a first set that is smaller than the second set and/or restricted by the constraint). The selection of whether the set of precoders is the first set or the second set may depend on the determined quality.

The constraint (which may also be referred to as a restriction) may be the more restrictive the lesser the determined quality. That is, the constraint may be the less restrictive the greater the determined quality. As a result of the constraint depending on the determined quality, the size of the set of precoders may be the increasing or non-decreasing function of the determined quality. The set for the lesser quality may be a proper subset of the set for the greater quality of the channel estimate. The set for the greater quality of the channel estimate may be the superset.

If the quality is poor (e.g., below the predefined quality threshold value), the constraint may correspond to predefined information that complements the information in the channel estimate, so that the information in the channel estimate is sufficient to reliably determine the precoder within the constrained set.

The transmission may use first and second frequency bands, first and second resource blocks, or first and second subcarriers. The constraint may be applied to the first frequency band, the first resource block, or the first subcarrier, while the precoder used for the second frequency band, the second resource block or the second subcarrier is determined independent of the quality of the channel estimate.

Alternatively or in addition, the constraint may comprise a frequency-selectivity that is a function of the determined quality of the channel estimate. The set may be frequency-selective depending on the determined quality of the channel estimate.

The transmission may use at least two frequency bands, at least two resource blocks, or at least two subcarriers. Different precoders out of the set may be used for different frequency bands, different resource blocks, or different subcarriers, if the determined quality is greater than a quality threshold value. Otherwise, the same precoder or a related precoder may be determined or may be available for the determination in all frequency bands, in all resource blocks, or in all subcarriers.

The constraint may comprise a relation or a correlates between precoders determined or available for the determination in different frequency bands, in different resource blocks, or in different subcarriers.

If the determined quality of the channel estimate is less than a quality threshold value, a number of subcarriers using a constant precoder for the transmission may be greater than a number of subcarriers using a constant precoder, if the quality of the channel estimate is greater than the quality threshold value. For example the precoders determined out of the set or the precoders available for the determination out of the set may vary between any pair of subcarriers, if the quality of the channel estimate is greater than the quality threshold value. Otherwise, the determination of a precoder in one frequency band, in one resource block, or in one subcarrier may imply or restrict the precoder determined or available for the determination in another frequency band, in another resource block, or in another subcarrier. For example, across all subcarriers in a frequency band, the same precoder or related precoders may be determined or may be available for the determination, if the quality of the channel estimate is less than the quality threshold value. The related precoders may correspond to the same beam direction. By way of example, the precoder for different frequencies may comprise different complex weights corresponding to the same beam direction (or main lobe direction) on the different frequencies.

Alternatively or in addition, the constraint may exclude or restrict at least one of a direction and a width of a transmit beam of the spatially precoded transmission.

The constraint may be a spatial constraint. The spatial constraint may comprise a spatial structure of the channel, e.g., limits or assumptions of the spatial structure. The spatial constraint may be predefined or preconfigured. For example, the constraint may exclude at least one predefined direction due to a static obstacle.

Each of the precoders in the set may define complex gains for respective multiple inputs of the multiple-input channel. The constraint may restrict the complex gains to an equal amplitude for all precoders in the set.

Two or more sets of precoders (e.g., a sequence of sets of precoders) may be defined (e.g., predefined or configured by the transmitting device). The size of the sets in the sequence may be defined based on a subset and/or superset relation between the sets in the sequence. For example, a first set may have a size less than the size of a second set, if the first set is a proper subset of the second set.

The set may be a first set, if the determined quality is less than or equal to a first quality threshold value. The set may be a second set, if the determined quality is greater than the first quality threshold value or greater than a second quality threshold value that is greater than the first quality threshold value.

The first set may be a proper subset of the second set. The first set may be referred to as a constrained set, restricted set or a subset. Alternatively, or in addition, the second set may be referred to as an unconstrained set, an unrestricted set or a superset. For example, the constraint may exclude for the first set a direction and/or a width of a transmit beam that is included (i.e. available as a precoder) in the second set.

The second set may be the superset and the first set may be the proper subset of the second set resulting from restricting the second set according to the constraint.

The method may further comprise or initiate a step of switching the set from the second set to the first set, when the determined quality falls below the first quality threshold value. Alternatively or in addition, the method may further comprise or initiate a step of switching the set from the first set to the second set, when the determined quality exceeds the first quality threshold value or the second quality threshold value that is greater than the first quality threshold value. The latter alternative can provide a hysteric or stable switching.

The switching may comprise switching between first and second control mechanisms for determining the at least one precoder out of the first and second sets of precoders, respectively. The first and second control mechanisms may be associated with the first and second sets, respectively.

Each of the precoders in the set (e.g., in each of the first and second sets) may have an equal total power or be normalized. The total power or norm of each precoder may correspond to the sum of the square of the absolute value of all gains (e.g., the gains for the multiple inputs of the multiple-input channel) of the respective precoder. Alternatively, the precoder of the second set may have different total power or different norms. The constraint may restrict the total power or norm of all precoders in the first set to be equal.

Each of the precoders in the first set may be normalized. Alternatively, or in addition, all of the precoders in the first set are mutually orthogonal.

The first set and/or the second set may be or may comprise a basis set, e.g., for beams in different directions and/or with different polarizations.

The number of precoders in the basis set may be M. The number of inputs of the multiple-input channel (e.g., the number of antenna ports) may be N. The number of precoders in the basis set may be greater than, equal to, or less than the number of inputs of the multiple-input channel. For example, $M \geq 8$ and/or $N \geq 8$.

The basis set may be orthogonal (i.e., the precoders in the basis set are mutually orthogonal) and/or normalized (i.e., each precoder in the basis set is normalized). For example, the m-th precoder may correspond to a vector $p_m = (g_m^{(1)}, \ldots, g_m^{(k)}, g_m^{(N)})^T$ with complex-valued gains $g_m^{(k)}$ (as the components of the vector $p_m$) for the k-th input of the multiple-input channel (e.g., the k-th antenna port).

The basis set may be orthogonal, if (e.g., and only if)

$(p_m, p_n) = \Sigma_{k=1 \ldots N} g_m^{(k)} (g_n^{(k)})^* = 0$ for all $1 \leq n \neq m \leq M$.

The basis set may be normalized, if (e.g., and only if)

$(p_m, p_m) = \Sigma_{k=1 \ldots N} |g_m^{(k)}|^2 = 1$ for all $m = 1 \ldots N$.

The basis set may be both normalized and orthogonal, i.e., orthonormal, if (e.g., and only if)

$\delta_{m,n} = (p_m, p_n) = \Sigma_{k=1 \ldots N} g_m^{(k)} (g_n^{(k)})^*$ for all $1 \leq m \leq n \leq M$.

Herein, the Kronecker-Delta is denoted by "$\delta_{m,n}$", i.e., $\delta_{m,n} = 0$ for min and $\delta_{m,n} = 1$ for m=n.

The basis set for different directions may correspond to a discrete Fourier transformation (DFT). For example, the complex-valued gains for the precoders (labelled by m) in the basis set may be proportional to $g_m^{(k)} = \exp(-2\pi i \cdot m \cdot k/N)$ or $g_m^{(k)} = \exp(-2\pi i \cdot m \cdot k/M)$.

Herein, the imaginary unit is denoted by "i", i.e., $i^2 = -1$.

The first set of precoders may comprise a grid of beams (GoB) and/or a basis set. A first control mechanism for determining the at least one precoder out of the first set of precoders may determine the at least one precoder that matches a DoA measured for signals from the respective receiving device. The DoA may be measured at the transmitting device for RS received from the at least one receiving device.

The GoB and/or the basis set may correspond to a codebook, e.g., any one of the codebooks specified in the 3GPP document TS 38.214, version 15.5.0 (e.g., in section 5.2.2.2).

The control mechanism determining the at least one precoder that matches the at least one DoA may be a reciprocity-based GoB (reci-GoB) precoding scheme. Optionally, two or more beams of the GoB may be combined using beamforming weights. The beamforming weights may be derived from the determined one or more DoAs.

Alternatively, or in addition, the control mechanism determines the at least one precoder out of the first set (e.g., the GoB) according to a feedback received from the at least one receiving device. The feedback may be indicative of a preferred precoder (i.e., a preferred beam of the GoB). For example, the transmitting device may transmit RS on beams of the GoB (e.g., by beam sweeping) and the feedback is indicative of the RS that uniquely identifies the preferred precoder.

Determining the channel estimate and/or determining the at least one precoder out of the first set may comprise determining the DoA of signals from the receiving device, preferably RSs from the receiving device. The transmission may be spatially precoded using the at least one beam of the GoB according to the determined DoA.

The DoA may be constant or flat or may vary slowly in the frequency domain and/or the time domain. Therefore, as a potential advantage, the first set can be robust to a (e.g., estimated) channel estimation error, sounding delay and precoding granularity. The determined DoA may also be reciprocal. Using the DoA may enable using channel reciprocity independent of whether frequency-division duplexing (FDD) or time-division duplexing (TDD) is used between the transmitting device and at least one of the one or more receiving devices. The precoder using the GoB according to the DoA is an example of a reciprocity-based GoB (reci-GoB) precoder.

The GoB may be a proper subset of a basis set.

The GoB may comprise one or more angular gaps according to the spatial constraint. Alternatively or in addition, an angular resolution of the GoB may depend on the spatial constraint. Preferably, the angular gaps are not covered by any one of the beams in the GoB. The angular gap or each of the angular gaps may correspond to a direction from the transmitting device to a stationary obstacle in a cell served by the transmitting device.

The second set may comprise linear combinations of the precoders in the first set. The second set may comprise linear combinations of the vectors representing the respective precoders in the first set. For example, the second set may comprise all linear combinations of the precoders in the first set, which are consistent with a power limit.

The at least one precoder may be determined out of the second set using a singular value decomposition (SVD) of the channel estimate and/or a minimum mean square error (MMSE) criterion of the channel estimate. The second control mechanism may determine the at least one precoder based on a SVD of the channel estimate and/or the MMSE criterion of the channel estimate.

Furthermore, the first and/or second quality threshold value may be a function of physical channel characteristics of the multiple-input channel. For example, the first quality threshold value and/or the second quality threshold value may depend on at least one of channel conditions of the multiple-input channel, delay spread of the multiple-input channel, spatial correlation of the multiple-input channel and an angular spread of the multiple-input channel. The first or second quality threshold value may be an increasing function of the delay spread, the spatial correlation, and/or the angular spread.

In the transmission, radio signals may be applied to antenna elements of an antenna array, e.g., an array of antenna elements. The precoder may output the radio signals, which are applied to the respective antenna elements of the antenna array. The spatial correlation may relate to the correlation of spatial channels associated with different antenna elements.

The first quality threshold value and/or the second quality threshold value may be independent of a number of the multiple inputs or the multiple-input channel, particularly independent of a number of antenna elements used for the transmission.

The method may further comprise or initiate a step of computing the first quality threshold value or the second quality threshold value as a crossover point or intersection between a first performance and a second performance achieved using the first set of precoders and the second set of precoders, respectively, for the spatial precoding on the multiple-input channel as a function of the quality of the channel estimate, particularly a radio quality. The computation may be triggered (e.g., as an update or recomputation) responsive to a change in any one of the physical channel characteristics of the multiple-input channel.

The first performance and the second performance may comprise at least one of a channel capacity, a precoding processing gain and a performance loss achieved by the spatial precoding on the multiple-input channel as a function of the quality of the channel estimate, particularly a radio quality. The precoding processing gain may be a measure for the gain due to spatial diversity of spatially precoded multiple-input channel. The performance loss may be measured in units of dB relative to an ideal precoder.

The quality of the channel estimate may be determined based on a measured radio quality of the multiple-input channel. The radio quality measured for determining the quality of the channel estimate may also be referred to as a radio quality measure.

The radio quality may be measured at the transmitting device. Alternatively, or in addition, the radio quality may be measured at (e.g., each of) the at least one receiving device and reported to the transmitting device.

The radio quality of the multiple-input channel may be measured at the transmitting device based on reference signals (RS) received from each of the at least one receiving device. The RS may comprise at least one of sounding reference signals (SRS); random access preambles; and demodulation reference signals (DMRS).

The quality of the channel estimate may be determined based on a report from each of the at least one receiving device. The report may be indicative of at least one of the quality of the channel estimate of the multiple-input channel to the respective receiving device and a result of measurements of the radio quality at the respective receiving device.

The radio quality may comprise at least one of a signal-to-noise ratio (SNR), a signal-to-interference-and-noise ratio (SINR), and a path loss.

The method may further comprise or initiate a step of determining the precoder for the transmission out of the set of precoders. The precoder may be determined out of the set (e.g., selected within the set) depending on the channel estimate. That is, the quality of the channel estimate (e.g., the radio quality) may control the set of precoders (particularly, the size of the set), which is used for determining the at least one precoder (particularly which restricts the available precoders), and the channel estimate may determine the precoder, which is used in the transmission, out of the set.

The channel estimate of the multiple-input channel may comprise at least one of the transfer function of the multiple-input channel and the DoA at the transmitting device. The transfer function may be a channel response function or a Green's function. The transfer function may be represented by a matrix H. One dimension of the matrix may correspond to the number of the multiple inputs of the multiple-input channel.

For example, the precoder derived from the transfer function may be numerically computed by the transmitting station. The result of the computation may be, by definition, in the second set (i.e., the second set may be defined as the set of precoders resulting from the computation). Alternatively, or in addition, the selection of the precoder from the first set may dependent on the DoA derived from the received RS.

The method may further comprise or initiate a step of receiving, at the transmitting device, RS from each of the at least one receiving device. The transmitting device may receive the RSs on the multiple-input channel, which is a multiple-output channel for the reception, from each of the at least one receiving device. The reception of the RSs from each of the at least one receiving device may be an UL reception. The transmission may be a DL transmission.

The channel estimate may be determined based on the received RS. Alternatively, or in addition, the quality of the channel estimate may be determined based on the received RS.

The measured radio quality of the multiple-input channel may comprise the SNR or SINR of the RS received at the transmitting device. Alternatively, or in addition, the measured radio quality of the multiple-input channel may comprise at least one of a signal strength of the RS, a reference signal received power (RSRP) of the RS, a reference signal received quality (RSRQ) of the RS, and a path loss of the RS.

The multiple-input channel may comprise a MIMO channel from the transmitting device to the at least one receiving device. The spatially precoded transmission on the MIMO channel may be referred to as a MIMO transmission. A precoder may be selected for each layer (or spatial stream) of the MIMO channel.

The multiple-input channel may extend from the transmitting device to one receiving device. The channel may be a SU-MIMO channel. The transmission may be a SU-MIMO transmission in the DL. The precoder may optimize or maximize a point-to-point communication from the transmitting device to the one receiving device.

The transmission may be a MU-MIMO transmission from the transmitting device to multiple receiving devices. At least one precoder may be determined (e.g., selected) for each of the multiple receiving devices. The MIMO channel may extend from the transmitting device to the multiple receiving devices. The MIMO channel may be a MU-MIMO channel. The transmission may be a MU-MIMO transmission in the DL. The precoder may optimize or maximize a utility function of a system (e.g., a cell or a RAN) comprising the multiple receiving devices. The system may also be referred to as a multi-user system. Each of the at least one precoder may be computed using (or may be consistent with) at least one of a maximum ratio transmission (MRT), a zero-forcing (ZF) precoding, and transmit Wiener precoding. For example, the utility function may comprise a (e.g., weighted) sum of device utilities. Each of the device utilities may be associate with a respective one the multiple receiving devices. For example, each of the device utilities may comprise a channel capacity for the respective receiving device. For example, the precoding may comprise a weighted MMSE precoding for single-antenna receiving devices, wherein the precoding weights for each of the receiving devices are selected to maximize a ratio between a signal gain at the respective receiving device and the interference generated at other receiving devices (e.g., with some weights) plus noise.

The radio quality measure and/or the quality of the channel estimate may be determined for each of the multiple receiving devices. The set of precoders and/or the size of the set may depend on each of the determined radio quality measures.

The spatially precoded transmission from the transmitting device may be received by the one or more receiving devices on the multiple-input channel. Any one of the transmitting device and the one or more receiving devices may be a radio device or a base stations. The transmitting device may be a base station configured to provide radio access in a radio access network (RAN) and/or a radio device configured to provide radio access in an ad hoc radio network. Alternatively, or in addition, the receiving device may be a radio device configured to wirelessly access a RAN and/or the ad hoc radio network.

The method aspect may be performed at or by the transmitting device (which may be briefly referred to as transmitter). The transmitting device may be a base station, e.g., for a DL or a backhaul link using the multiple-input channel. Alternatively or in addition, the transmitting device may be a radio device, e.g., for an UL or a SL using the multiple-input channel. The receiving device may be a base station, e.g., terminating the backhaul link or the UL. Alternatively or in addition, the receiving device may be a radio device, e.g., terminating the DL or the SL.

In any aspect, the transmitting device and/or the at least one receiving device may form, or may be part of, a radio network, e.g., according to the Third Generation Partnership Project (3GPP) or according to the standard family IEEE 802.3.3. (Wi-Fi). The method aspect may be performed by one or more embodiments of the transmitting and receiving devices, respectively, in the radio network. The radio network may be the RAN. The RAN may comprise one or more base stations, e.g., acting as the transmitting or receiving device. Alternatively or in addition, the radio network may be a vehicular, ad hoc and/or mesh network comprising two or more radio devices, e.g., acting as the transmitting and receiving devices.

Any of the radio devices may be a 3GPP user equipment (UE) or a Wi-Fi station (STA). The radio device may be a mobile or portable station, a device for machine-type communication (MTC), a device for narrowband Internet of Things (NB-IoT) or a combination thereof. Examples for the UE and the mobile station include a mobile phone, a tablet computer and a self-driving vehicle. Examples for the portable station include a laptop computer and a television set. Examples for the MTC device or the NB-IoT device include robots, sensors and/or actuators, e.g., in manufacturing, automotive communication and home automation. The MTC device or the NB-IoT device may be implemented in a manufacturing plant, household appliances and consumer electronics.

Any of the radio devices may be wirelessly connected or connectable (e.g., according to a radio resource control, RRC, state or active mode) with any of the base stations. The base station may encompass any station that is configured to provide radio access to any one of the at least one radio device. The base stations may also be referred to as transmission and reception point (TRP), radio access node or access point (AP). The base station or one of the radio devices functioning as a gateway (e.g., between the radio network and the RAN and/or the Internet) may provide a data link to a host computer providing user data. Examples for the base stations may include a 3G base station or Node B (NB), 4G base station or eNodeB (eNB), a 5G base station or gNodeB (gNB), a Wi-Fi AP and a network controller (e.g., according to Bluetooth, ZigBee or Z-Wave).

The RAN may be implemented according to the Global System for Mobile Communications (GSM), the Universal Mobile Telecommunications System (UMTS), 3GPP Long Term Evolution (LTE) and/or 3GPP New Radio (NR).

Any aspect of the technique may be implemented on a Physical Layer (PHY), a Medium Access Control (MAC) layer, a Radio Link Control (RLC) layer and/or a Radio Resource Control (RRC) layer of a protocol stack for the radio communication. For example, the precoder may be determined out of the set on the PHY layer, and the set (particularly the size of the set) may be controlled by the MAC, RLC or RRC layer.

As to another aspect, a computer program product is provided. The computer program product comprises program code portions for performing any one of the steps of the method aspect disclosed herein when the computer program product is executed by one or more computing devices. The computer program product may be stored on a computer-readable recording medium. The computer program product may also be provided for download, e.g., via the radio network, the RAN, the Internet and/or the host computer. Alternatively, or in addition, the method may be encoded in a Field-Programmable Gate Array (FPGA) and/or an Application-Specific Integrated Circuit (ASIC), or the functionality may be provided for download by means of a hardware description language.

As to a device aspect, a device for transmitting on a multiple-input channel from a transmitting device to at least one receiving device is provided. The device is configured to perform any one of the steps of the method aspect.

As to a further device aspect, a device for transmitting on a multiple-input channel from a transmitting device to at least one receiving device is provided. The device comprises at least one processor and a memory. Said memory comprises instructions executable by said at least one processor whereby the device is operative to perform any one of the steps of the method aspect.

As to a still further aspect a communication system including a host computer is provided. The host computer comprises a processing circuitry configured to provide user data. The host computer further comprises a communication interface configured to forward the user data to the RAN (e.g., a cellular network and/or the base station) for transmission to the at least one radio device (e.g., a UE). A processing circuitry of the RAN (e.g., the base station and/or the cellular network) is configured to execute any one of the steps of the method aspect. Alternatively or in addition, the radio device (e.g., the UE) comprises a radio interface and processing circuitry, which is configured to execute any one of the steps of the method aspect.

The communication system may further include the at least one radio device (e.g., the UE). Alternatively, or in addition, the RAN (e.g., the cellular network) may further include one or more base stations configured for radio communication with the at least one radio device (e.g., the UE) and/or to provide a data link between the at least one radio device (e.g., the UE) and the host computer using the method aspect.

The processing circuitry of the host computer may be configured to execute a host application, thereby providing the user data and/or any host computer functionality described herein. Alternatively, or in addition, the processing circuitry of the UE may be configured to execute a client application associated with the host application.

Any one of the devices, the UE, the base station, the communication system or any node or station for embodying the technique may further include any feature disclosed in the context of the method aspect, and vice versa. Particularly, any one of the units and modules disclosed herein may be configured to perform or initiate one or more of the steps of the method aspect.

BRIEF DESCRIPTION OF THE DRAWINGS

Further details of embodiments of the technique are described with reference to the enclosed drawings, wherein:

FIG. 3 schematically illustrates an example of a basis set according to a first example of sets for an embodiment of the device of FIG. 1;

FIG. 4 schematically illustrates exemplary precoders in a first set of precoders according to the first example of sets;

FIGS. 13 and 14 show flowcharts for methods implemented in a communication system including a host computer, a base station or radio device functioning as a gateway and a user equipment.

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a New Radio (NR) or 5G implementation, it is readily apparent that the technique described herein may also be implemented for any other radio communication technique, including a Wireless Local Area Network (WLAN) implementation according to the standard family IEEE 802.11, 3GPP LTE (e.g., LTE-Advanced or a related radio access technique such as Multe-Fire), for Bluetooth according to the Bluetooth Special Interest Group (SIG), particularly Bluetooth Low Energy, Bluetooth Mesh Networking and Bluetooth broadcasting, for Z-Wave according to the Z-Wave Alliance or for ZigBee based on IEEE 802.15.4.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising at least one computer processor and memory coupled to the at least one processor, wherein the memory is encoded with one or more programs that may perform the functions and steps or implement the units and modules disclosed herein.

Figure 1:
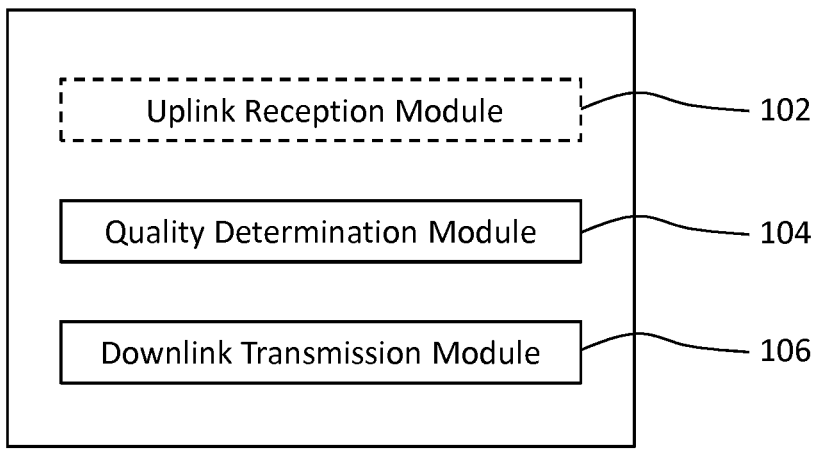
FIG. 1 shows a schematic block diagram of an embodiment of a device for transmitting on a multiple-input channel from a transmitting device to at least one receiving device.

FIG. 1 schematically illustrates a block diagram of an embodiment of a device for transmitting on a multiple-input channel from a transmitting device to at least one receiving device. The device is generically referred to by reference sign 100.

The device 100 comprises a quality determination module 104 that determines a quality of a channel estimate of the multiple-input channel from the transmitting device to the at least one receiving device. The device 100 further comprises a transmission module 106 (e.g., a downlink transmission module 106) that transmits on the multiple-input channel from the transmitting device to the at least one receiving device. The transmission is spatially precoded using at least one precoder determined out of a set of precoders. A size of the set of precoders is an increasing or non-decreasing function of the determined quality of the channel estimate.

Optionally, the device 100 comprises a reception module 102 (e.g., an uplink reception module 102) that receives at least one of a report from the receiving device and reference signals (RS) from the receiving device. The report is indicative of the quality of the channel estimate. Alternatively, or in addition, the transmitting device estimates the quality of the channel estimate based on the RS.

The transmitting device may be a base station. The receiving device may be a radio device. The transmission to the at least one radio device may be a downlink (DL) transmission. The reception from the receiving device may be an uplink (UL) reception.

Any of the modules of the device 100 may be implemented by units configured to provide the corresponding functionality.

The device 100 may also be referred to as, or may be embodied by, the transmitting device (or briefly: transmitter). The transmitting device 100 and the at least one receiving device may be in direct radio communication, e.g., at least for the spatially precoded transmission from the transmitting device 100 to the at least one receiving device.

Figure 2:
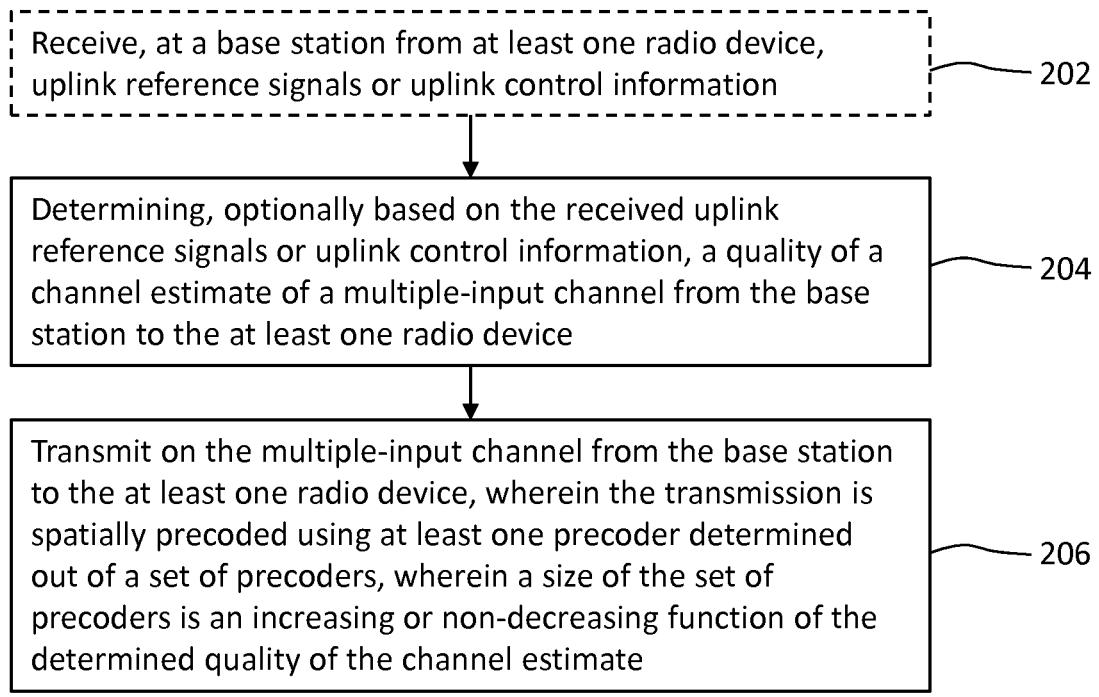
FIG. 2 shows a flowchart for a method of transmitting on a multiple-input channel from a transmitting device to at least one receiving device, which method may be implementable by the device of FIG. 1.

FIG. 2 shows an example flowchart for a method 200 of transmitting on a multiple-input channel from a transmitting device to at least one receiving device. In a step 204, a quality of a channel estimate of the multiple-input channel from the transmitting device to the at least one receiving device is determined. In a step 206, a transmission is performed on the multiple-input channel from the transmitting device to the at least one receiving device. The transmission 206 is spatially precoded using at least one precoder determined out of a set of precoders. A size of the set of precoders is an increasing or non-decreasing function of the determined quality of the channel estimate.

Optionally, the determination 204 of the quality of the channel estimate is based on a measure of radio quality of the multiple-input channel (which is also referred to as radio quality measure or, briefly, radio quality). The radio quality may be a signal-to-noise ratio (SNR) and/or a path loss. Herein, whenever referring to the SNR, a corresponding step, feature or effect is also disclosed for noise power, interference power and/or a signal-to-interference-and-noise ratio (SINR).

The radio quality of the multiple-input channel may be measured at the transmitting device based on RS received in a step 202 from each of the at least one receiving device. Alternatively, or in addition, the quality of the channel estimate may be determined based on a report received in the step 202 from each of the at least one receiving device. The report may be indicative of the quality of the channel estimate of the multiple-input channel (e.g., to the respective receiving device) and/or indicative of a result of measurements of the radio quality at the respective receiving device.

The method 200 may be performed by the device 100. For example, the modules 102, 104 and 106 may perform the steps 202, 204 and 206, respectively.

The technique may be applied to uplink (UL), downlink (DL) or direct communications between radio devices, e.g., device-to-device (D2D) communications or sidelink (SL) communications.

Each of the transmitting device 100 and the at least one receiving device may be a radio device or a base station. Herein, any radio device may be a mobile or portable station and/or any radio device wirelessly connectable to a base station or RAN, or to another radio device. For example, the radio device may be a user equipment (UE), a device for machine-type communication (MTC) or a device for (e.g., narrowband) Internet of Things (IoT).

Two or more radio devices may be configured to wirelessly connect to each other, e.g., in an ad hoc radio network or via a 3GPP SL connection (as one example of a wireless communication network). Furthermore, any base station may be a station providing radio access, may be part of a radio access network (RAN) and/or may be a node connected to the RAN for controlling the radio access (as another example of the wireless communication network). For example, the base station may be an access point, for example a Wi-Fi access point.

In any aspect, the transmitting device (e.g., a gNB) and/or the at least one receiving device (e.g., at least one UE) are equipped with multiple antennas (i.e., multiple antenna elements), which allows for spatial diversity to transmit signals in the step 206 (e.g., data in UL and/or DL directions).

While the multiple-input channel is hereinafter primarily described as a multiple-input multiple-output (MIMO) channel for concreteness and conciseness, each embodiment of the technique may also be implemented for a multiple-input single-output (MISO) channel (e.g., a beam carrying a single layer).

The multiple-input channel may be a MIMO channel to the at least one radio device (e.g., at least one UE). Particularly, the multiple-input channel may be part of a multi-user MIMO (MU-MIMO) communication. In the MU-MIMO communication, the at least one precoder used in the transmission 206 enables the transmitting device 100 (e.g., a gNB) to serve several receiving devices (e.g., UEs) simultaneously with the same time and frequency resource in the wireless communication network (e.g., the RAN). The transmission 206 may use the at least one precoder to form a beam from the gNB 100 toward the intended UEs.

The spatial diversity obtained in the step 206 increases the capacity of the network dramatically, or equivalently one can say that it offers a more efficient utilization of the frequency spectrum. Moreover, MU-MIMO can reduce the inter-cell interference which in turn, leads to more frequency re-use. As the electromagnetic spectrum is a rare resource, MU-MIMO is a vital solution for the extension of the capacity of the wireless communication network.

A key point for an effective MU-MIMO communication is that the transmitting device 100 (e.g., the gNB) has access to (e.g., knowledge of) an accurate channel estimate to determine the at least one precoder out of the set. The channel estimate may comprise a channel response function and/or a DoA.

The channel estimate may be an estimate of the channel response function (i.e., the transfer function) for the multiple-input channel from the gNB 100 to the UEs that are in a cell that is associated with the gNB 100. The channel response function may be based on RS transmissions in the DL (e.g., transmitted in the step 206) and/or the UL (e.g., as received in the step 202).

Examples of the RS include sounding RS (SRS). The SRS may be implemented as Sounding Reference Symbols in 3GPP LTE and NR. The reception of RS for determining the channel estimate is also referred to as "sounding".

The channel estimate for the multiple-input channel may be determined by transmitting a number of RS (also referred to as pilot symbols) by the UEs to the gNB 100. The transmission 206 may be a reciprocity-based DL transmission in the MU-MIMO communication. For example, the channel estimate for the UL direction may be converted to the channel estimate for the multiple-input channel in the DL using channel reciprocity. By way of example, the transfer function for the UL may be represented by a matrix and the conversion to the transfer function for the DL may comprise the Hermitian conjugate of the matrix.

For a TDD communication between the transmitting device 100 and the receiving device, it is possible to apply the (physical) channel reciprocity and use the UL sounding and the resulting channel estimate for the UL to obtain the channel estimate for the DL as well.

Herein, the step of determining the precoder out of the set as a function of the channel estimate for the multiple-input channel is also referred to as a control mechanism or an adaptation of the spatial precoding.

The channel estimate obtained for the DL, consequently, can be used to calculate the weight for the spatial precoding (e.g., for beamforming) in the DL transmission 206. The reciprocity-based control mechanisms for the beamforming in the DL transmission 206 are successfully applied in the MU-MIMO communication, e.g., used in the fifth generation (5G) of cellular wireless communication network according to 3GPP NR.

This class of control mechanisms (or adaptations) of the spatial precoding are applicable whenever the channel reciprocity holds. For example, the channel response functions in the UL direction and the DL direction may be the same up to a change in the role of the transmitting device 100 and the receiving device, wherein output power differences are disregarded. Using channel reciprocity, the control mechanism uses the channel estimate in the UL direction resulting from the step 202 for beamforming in the DL transmission 206. This principle holds, when TDD (or more generally, time-division multiplexing) is used for sharing data transmission time between the DL transmission 206 and the UL transmission.

In summary, spatial precoding (e.g., beamforming) in the transmission 206 uses channel reciprocity for determining the channel estimate from the RS (e.g., pilot symbols) previously transmitted from the receiving devices (e.g., UEs) to the transmitting device 100 (e.g., gNB) in the step 202. The channel estimate is determined in the UL direction and also valid in the DL direction by transposing the channel matrix representing the channel estimate determined for the UL.

There are a large body of sets of precoders (and, optionally, associated control mechanisms determining the precoder out of the set) in the literature on precoding the multiple-input channel (particularly, the MIMO channel). However, there is not a single set of precoders and/or a single control mechanism for determining the precoder out of the set, which is better than other sets of precoders and/or other control mechanisms independent of the quality of the channel estimate, particularly independent of the quality of the available channel information at the transmitter (CSIT) side.

With a reciprocity-based control mechanism for determining the precoder used for the spatial precoding in the DL transmission 206 (e.g., in a 5G RAN such as a 3GPP NR implementation), the CSIT may be (e.g., mainly) based on UL reference signals, such as SRS, received at the transmitting device 100 from each of the at least one receiving device. This means that the quality of the CSIT depends on a SNR in the UL, e.g., including a path loss in the UL.

For one range of the path loss, one set of precoders and/or one control mechanism may outperform other sets and/or other control mechanisms (e.g., in terms of maximizing the SINR at the receiving device), while another set and/or another algorithm may perform better than the others in a another range of the path loss. This means that selecting a single set and/or applying a single control mechanism (e.g., independent of the quality of the channel estimate) is not optimum and will degrade the capacity of the wireless communication network.

Embodiments of the technique take into account the quality of the UL channel estimates, using some quality measure, when the transmitting device 100 (e.g., a gNB) selects the set of precoders (and, optionally, a control mechanism associated with the selected set for determining the precoder out of the set) for the (e.g., DL) transmission 206. In other words, the gNB looks at the accuracy that it has for the channel estimate, then selects the set of precoders (and, optionally, the associated control mechanism determining the precoder out of the set) that outperforms others for the given quality of the channel estimate.

An implementation of the method 200 comprises at least one of the following steps. In the step 204, the quality of the (e.g., UL) channel estimate is determined, e.g., calculated using at least one of the following radio quality measures: a SNR (e.g., an UL SNR), a path loss, a signal strength (e.g., an UL signal strength), and an estimated error of a channel estimate (e.g., an estimate of a mean square error, particularly of an UL channel estimation error). In the step 206, the quality of the channel estimate is compared to one or more (e.g., pre-calculated) quality threshold values for determining the set and, optionally, a control mechanism associated with the set for determining the precoder out of the set. The size of the set, which is determined depending on a result of the comparison, is an increasing or non-decreasing function of the quality of the channel estimate. The at least one precoder is determined out of the set, i.e., the associated control mechanism of the precoding scheme is performed. For example, the precoder that maximizes the received SINR (e.g., at the receiving device) is determined from the set of precoders.

In a first embodiment, the sequence of sets (and, optionally, associated control mechanisms for determining the precoder out of the respective sets) comprises a first set including a grid of beams (GoB) for the spatial precoding according to reciprocity-based grid of beams (reci-GoB) and a second set for the spatial precoding according to a singular value decomposition (SVD).

In a second embodiment, which may be combined with the first embodiment, a criterion for switching between the first set and the second set is the quality of the channel estimate. The quality of the channel estimate may be determined from (or be equal to) a radio quality measure (i.e., a measure for the radio quality) of the multiple-input channel.

For example, the criterion for switching between the first set and the second set may be a SNR measured or estimated at the transmitting device 100, e.g., an estimated UL element SNR.

In a third embodiment, which may be combined with the first and/or the second embodiment, the quality of the channel estimate for the multiple-input channel and/or the quality of information available at the transmitting device 100 (e.g., at the gNB) about the multiple-input channel (e.g., the wireless channel from the gNB to the UE) is a parameter or criterion for determining a precoding scheme to be used in the transmission 206.

Herein, the precoding scheme may encompass the set of precoders and, optionally, a control mechanism for determining the precoder out of the set. The control mechanism may also be referred to as an adaptive algorithm or adaptation of the spatial precoding.

In a first variant of any embodiment, the precoder is determined out of the set using the channel response function (i.e., the transfer function) estimated from RS (e.g., SRS) received at the transmitting device 100 from each of the at least one receiving device (e.g., in the UL direction). Consequently, the determination of the precoder within the set relies on the channel reciprocity (e.g., applicable in TDD communication between the transmitting device 100 and each of the at least one receiving device).

In a first example of sets, which is applicable to any of the embodiments, the first set is a basis set. Each of the precoders in the basis set corresponds to one or more beams. Different precoders in the basis set correspond to different directions. The basis set may correspond to a surjective or injective mapping (e.g., a linear function) of spatial layers to the multiple inputs of the multiple-input channel (e.g., antenna ports or antenna elements at the transmitting device).

For example, the basis set may be an orthogonal basis for the multiple inputs of the multiple-input channel. Alternatively, or in addition, different precoders in the first set may correspond to different phase shifts between neighboring antenna elements. For each of the precoders in the first set, the phase shift between neighboring antenna elements may be equal for all neighboring antenna elements.

In the first example of sets, the second set is a proper (i.e., strict) superset of the first set. For example, the second set may comprise any linear combination of one or more precoders in the first set, e.g., any linear combination that fulfills a power limit.

In any embodiment, the set that is used depending on the determined quality of the channel estimate may be stored at the transmitting device 100 (e.g., stored in volatile or non-volatile memory at the transmitting device 100). Alternatively, the precoder is determined out of the set without generating all or without generating any other precoder in the set. For example, only the determined precoder is generated at the transmitting device 100 as the determined precoder is needed for the transmission 206. For example, the precoder out of the second set may be generated by linearly combining one, two or more precoders out of the first set.

FIG. 3 schematically illustrates an example for the basis set 300 of precoders 302. Each of the precoders 302 corresponds to one or more beams. Different precoders 302 in the basis set 300 correspond to different directions relative to the antenna elements 310. For example, the basis set 300 is a GoB.

In the example of FIG. 3, each of the precoders 302 in the basis set 300 correspond to one beam. An angular distribution of power (e.g., the magnitude of a Poynting vector) is schematically illustrated as a radial coordinate of a polar plot. Preferably, the beams do not overlap, e.g., asymptotically, i.e., for a distance from the antenna elements 310 that is multiple time greater than the antenna array comprising the antenna elements 310).

Each of the FIGS. 4A to 4D schematically illustrates an example of a precoder 402 determined out of the first set, which is the basis set 300 according to the first example of sets. The precoder 402 is determined out of the first set 300 depending on a respective one of the channel states 400-A to 400-D of the multiple-input channel, i.e., depending on the channel estimate. The channel estimate may be the channel response function or the DoA measured or estimated in the step 202.

While the precoder 402 is determined out of the first set 300 depending on the channel estimate, a decision whether the first set or the second set of precoders (e.g., a first or a second precoding scheme) is applied for determining the precoder depends on the determined quality of the channel estimate.

Figure 5:
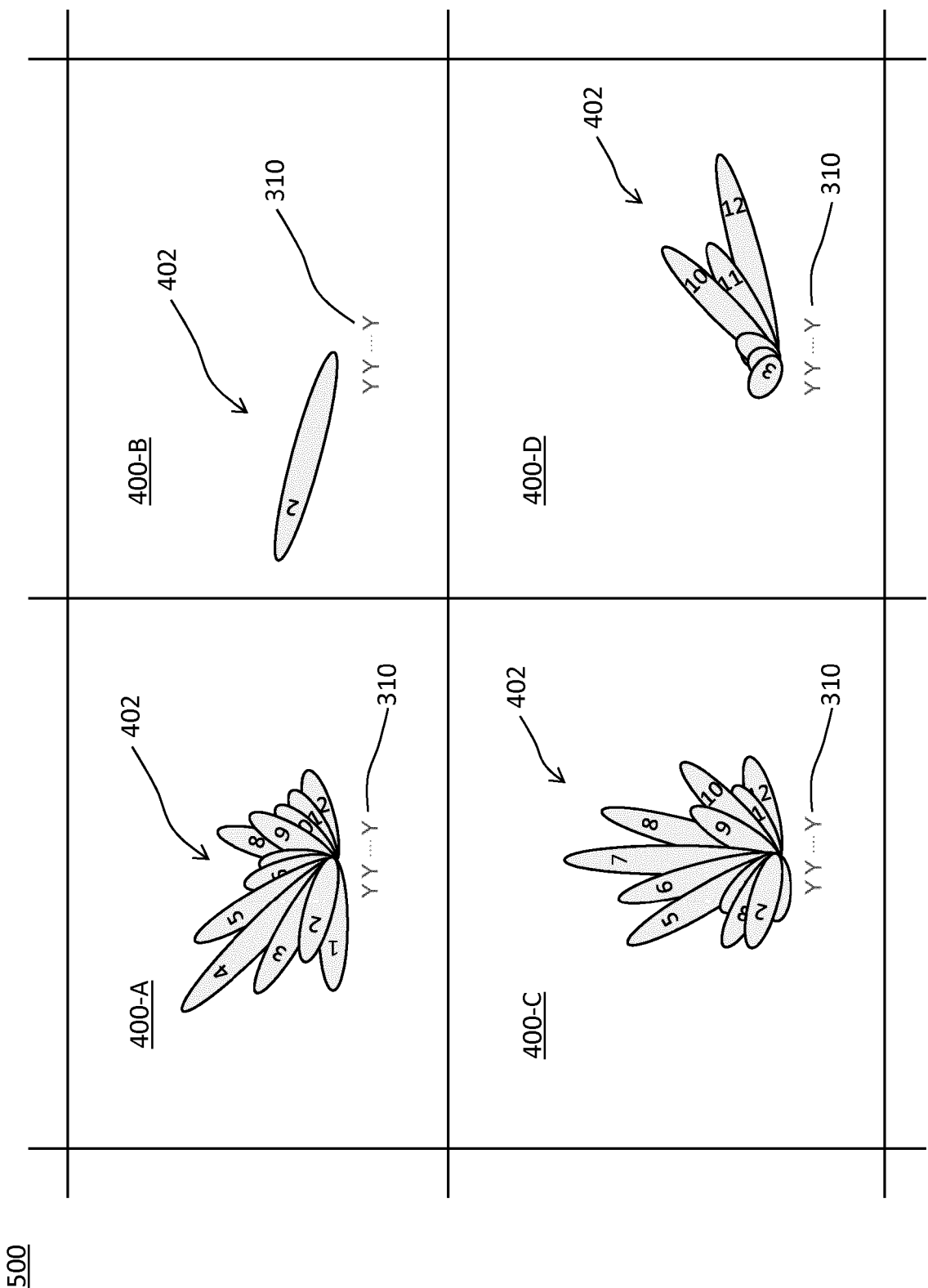
FIG. 5 schematically illustrates exemplary precoders in a second set of precoders according to the first example of sets.

In accordance with the first example of sets, FIG. 5 schematically illustrates an example of the second set 500. The precoders 402 illustrated in FIG. 5 are in the second set 500. Each of the precoders 402 in the second set 500 is a linear combination of one, two or more precoders in the first set 300. For example, in each of the channel states 400-A, 400-C and 400-D, the precoder 402 determined out of the second set 500 is a linear combination of more than two precoders of the first set 300. In the channel state 400-B, the precoder 402 determined out of the second set 500 is a linear combination of one precoder of the first set 300 (e.g., the one precoder as comprised in the first set 300 or a scaled precoder of the first set 300).

While FIG. 5 illustrates four precoders in the second set 500, the number of precoders in the second set 500 may be much higher. Particularly, the number of precoders in the second set 500 is greater than the number of precoders in the first set 300.

More specifically, the different channel states 400-A to 400-D in FIG. 5 may correspond to the respective channel states 400-A to 400-D in FIGS. 4A to 4D. As can be observed, the second set 500 allows for a more fine-grained spatial precoding in the step 206, since the size of the second set is much larger than the first set 300. This more fine-grained spatial precoding is performed if the quality of the channel estimate justifies or enables reliably determining the precoder 402 out of the second set 500 that is larger than the first set 300. In the exceptional case of the channel state 400-B, the channel estimate is such that the precoder 402 determined out of the second set 500 is one of the precoders in the first set 300. That is, no linear combination of two or more precoders of the first set 300 is necessary, since one of the precoders 302 of the basis set results from the control mechanism according to the second precoding scheme.

In a second example of the sets, the first set is a proper (i.e., strict) subset of the second set. The second set may be a basis set, i.e., different precoders in the second set correspond to different directions. For example, the second set is a GoB.

Figure 7:
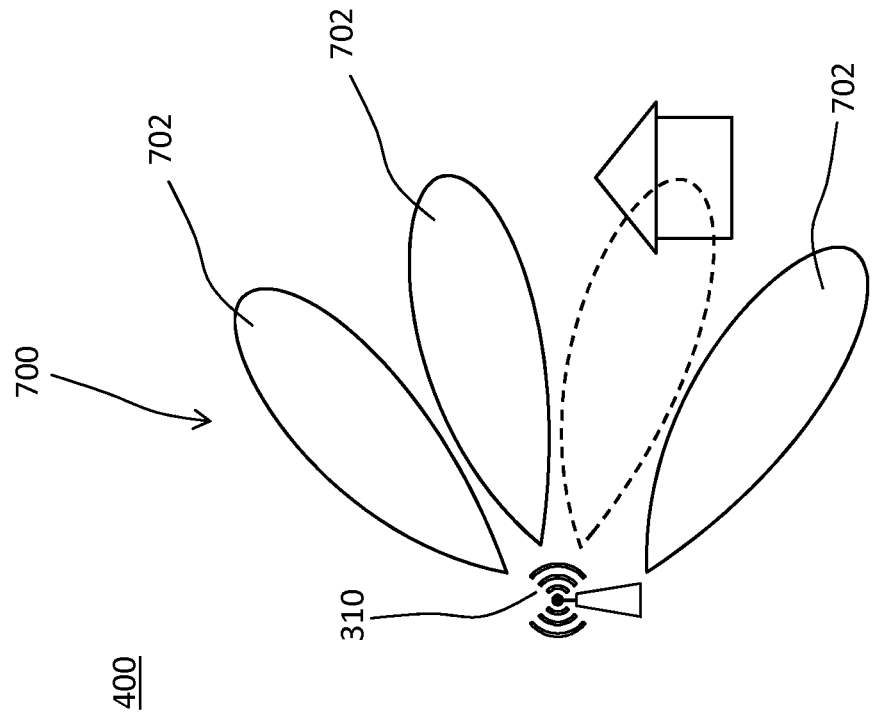
FIG. 7 schematically illustrates exemplary precoders in a first set of precoders according to the second example of sets.
Figure 6:
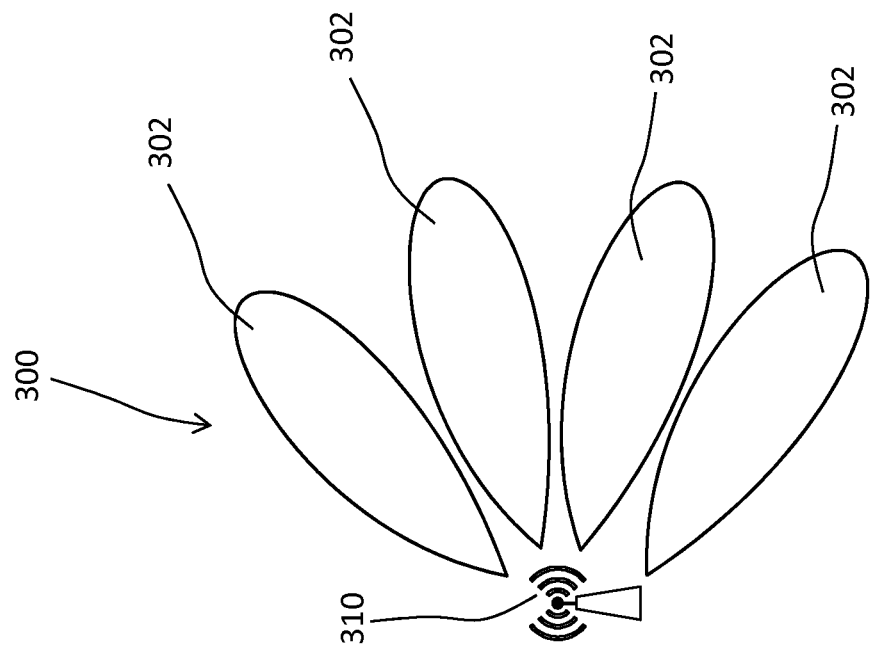
FIG. 6 schematically illustrates an example of a basis set according to a second example of sets for an embodiment of the device of FIG. 1.

FIG. 6 schematically illustrates a basis set 300 as an example of the second set according to the second example of sets. When the quality of the channel estimate falls below the first threshold value, a constraint is applied that restricts the second set resulting in the first set. As schematically illustrated in FIG. 7, one or more precoders (that are in the second set 300) are excluded from the first set 700, because the corresponding one or more beams are directed towards stationary obstacles, resulting in the precoders 702 of the first set 700.

The first and second examples of the sets may be applied with any of the embodiments. Moreover, the first and second examples of sets may be combined. For example, if the quality of the channel estimate is greater than a threshold value A (which may be the first threshold value in the context of the first example of sets), the second set 500 according to the first example of sets is used for the spatial precoding. That is, the precoder 402 is a linear combination of some basis set 300. If the quality of the channel estimate is greater than a threshold value B and less than the threshold value A, the basis set 300 (e.g., according to the first or the second example of sets) is used for the spatial precoding. If the quality of the channel estimate is less than a threshold value B, the first set 700 according to the second example of sets is used for the spatial precoding. That is, the precoder 702 is determined based on the channel estimate under a constraint that excludes one or more precoders 300 of the basis set 300. The threshold value B may be the first threshold value in the context of the second example of sets, and/or may be less than the threshold value A.

In any embodiment, considering or ignoring a structure that the multiple-input channel (i.e., a wireless communication channel) might have, the first and second sets of precoders (and, optionally, associated control mechanisms determining the precoder out of the respective sets) can be categorized to channel-structure-constrained precoding using the first set and channel-structure-unconstrained precoding using the second set.

Each of the first and second sets may be associated with a control mechanism that determines the precoder out of the respective set. The control mechanisms associated with the first and second sets may comprise constrained and unconstrained precoding methods, respectively.

The category of the unconstrained precoding methods is quite rich. Examples of the unconstrained precoding method comprise singular-value-decomposition (SVD)-based precoding and minimum-mean-square-error (MMSE) precoding. An example for the constrained precoding method is the reciprocity-based grid of beams (reci-GoB) method.

An exemplary implementation of the reci-GoB method, e.g., as described below, may be applied for determining the precoder out of the first set in any of the embodiments. The reci-GoB method may be based on a GoB (grid of beams) as the set or the super set. The precoder may be determined out of the set based on a SRS measurement and/or a DoA, e.g., in the step 202. This may imply that the reci-GoB method is also a reciprocity-based precoding method.

The quality of the channel estimate may be based on the SNR of the SRS.

Optionally, the quality of the channel estimate may be based on measurements on a channel state information RS (CSI-RS) that is transmitted in the step 202 from the transmitting device 100 (e.g., a gNB) and reported from the receiving device (e.g., a UE on the uplink) back to the transmitting device 100. The received SNR at the receiving device (e.g., the UE) may be computed and reported for each precoder in a codebook. The codebook may be a basis set 300. The codebook may or may not be taken from 3GPP NR or LTE standards.

In a variant of the reci-GoB method, the receiving device transmits (e.g., a UE) transmits RS to the transmitting device 100, which measures the DoA in the step 202. The transmitting device 100 determines the precoder having a direction of the corresponding beam closest to the measured DoA. That is, the precoder is determined out of the first set (e.g., among the precoders of the GoB) based on the measured DoA. This implies that the reci-GoB method is also a reciprocity-based precoding method.

In an embodiment of the transmitting device 100 implementing the method 200, the quality of the channel estimate may be measured in terms of an UL SNR. At a low UL SNR (e.g., below the first threshold value), i.e., when the quality of the UL channel estimate available at the gNB 100 is poor, the first set of precoders (and, optionally, the associated control mechanism determining the precoder out of the first set) makes some reasonable assumption about a channel structure of the multiple-input channel. By virtue of the constraint, the first precoding scheme (i.e., the first set restricted by the constraint, and optionally, the associated control mechanism for determining the precoder out of the first set) can be more robust when the quality of the channel estimate is poor as compared other precoding schemes that are not constrained by a presumed or predefined channel structure.

When the UL SNR is high (e.g., the quality is greater than the first threshold value), the channel estimate is accurate enough for an unconstrained precoding scheme to be able to extract the structure of the multiple-input channel and form the one or more beams with much less or no channel structure assumed (i.e., predefined by some constraint) for the multiple-input channel. Therefore, the unconstrained precoding scheme (i.e., the second set of precoders, and optionally, an associated control mechanism) leads to a better performance, because it is more fine-grained. More specifically, the unconstrained precoding scheme can lead to a better performance as there might be some mismatch between the assumed channel structure (i.e., the channel structure assumed by the constraint) and the actual channel structure of the multiple-input channel.

Any one of the embodiments disclosed herein may be implemented using at least one of the following radio quality measures for determining the quality of the channel estimate (e.g., the UL channel estimate) in the step 204. A SNR or SNIR (e.g., an UL SNR at the transmitting device 100) is a first measure for determining the quality of the channel estimate. Signal strength (e.g., UL signal strength) at the transmitting device 100 or a path loss (e.g., in the UL) is a second measure for determining the quality of the channel estimate. An estimate of a channel estimation error (e.g., an estimate of an UL channel estimation error) obtained from a channel estimation process for determining the channel estimate (e.g., the UL channel estimate) at the transmitting device 100 (e.g., a gNB) is a third measure for determining the quality of the channel estimate.

In any of the embodiments, the radio quality (in particular interference at the transmitting device 100, the UL SNR or the UL SINR) may be used as a measure for the quality of the channel estimate (e.g., without or prior to determining the channel estimate). The radio quality may be estimated using the method disclosed in the document US 2018/0115381 A1.

Any one of the radio quality measures (e.g., any of the above-mentioned three measure) may be used as a measure of the quality of the channel estimate. Any one of the radio quality measures may be computed using at least one of the following examples.

First examples of the input for the radio quality measures comprise UL RS received in the step 202 from each of the at least one receiving device, e.g., SRS, a random access preamble received on a physical random access channel (PRACH) and/or UL demodulation RS (DMRS). First examples of the radio quality measures may comprise at least one of received RS strength or received RS power (RRSP); a channel estimation processing gain (e.g., determined from window selection in transform-based channel estimation, wherein a large window corresponds to less processing gain); power of residuals after channel estimation; channel estimation signal strength; and SRS bandwidth.

Second examples of the radio quality measures comprise interference and/or noise measured on non-allocated UL resources.

Third examples of the radio quality measures comprise interference and/or noise measured on non-allocated UL resources. The non-allocated UL resources may comprise radio resources that are not allocated by the transmitting device (e.g., a gNB) and/or not allocated to the receiving device (e.g., a UE).

Fourth examples of the radio quality measures comprise power control parameters, e.g., a power headroom. The power control parameters may be received in the step 202 in a report from each of the at least one receiving device.

A fifth example of the radio quality measures comprises an estimate of the pathloss, e.g., indicated in a report received in the step 202. The report may be indicative of the pathloss resulting from measurements at each of the at least one receiving device (e.g., DL measurements).

A sixth example of the radio quality measures comprises a channel state information (CSI) report received in the step 202 from each of the at least one receiving device. The CSI may result from measurements (e.g., measurements on CSI-RS transmitted from the transmitting device 100) at each of the at least one receiving device (e.g., DL measurements).

A seventh example of the radio quality measures comprises a rate of successfully decoding (i.e., a decoding success rate) on a physical UL shared channel (PUSCH).

Any combination of the above radio quality measures may be input to determining the quality of the channel estimate in the step 204.

Having determined the quality of channel estimate in the step 204, the transmitting device 100 determines (e.g., chooses) the set of precoders. For example, the precoding scheme comprising the set of precoders that maximizes the SINR at the receiving device (e.g., a UE) may be chosen.

The step 206 may be implemented (e.g., in any of the above-described embodiments) by comparing the determined quality of the channel estimate with one or more quality threshold values. For example, any one or any combination of the radio quality measures (as indicator of the quality of the channel estimate) may be compared to one or more quality threshold values.

The one or more quality threshold values may be pre-computed. For example, the one or more quality threshold values may be pre-computed based on performance curves (i.e., curves indicative of the performance, e.g., a bit error rate or a block error rate) provided for all sets of precoders (i.e., for all precoding schemes). An intersection of two performance curves as a function of the quality of the channel estimate (e.g., the radio quality measure) may define the quality threshold value for switching between the corresponding sets of precoders. Alternatively, or in addition, the one or more quality threshold values may be pre-computed based on a precoding processing gain obtained by computation. An intersection of two precoding processing gains as a function of the quality of the channel estimate (e.g., the radio quality measure) may define the quality threshold value for switching between the corresponding sets of precoders. Alternatively, or in addition, the one or more quality threshold values may be pre-computed based on statistics about the performance of precoding schemes, i.e., different sets of precoders (and, optionally, control mechanisms associated with the respective sets for determining the precoder out of the set). The statistics may be acquired at the transmitting device 100 and/or on a longer time scale (e.g., over time period that comprises multiple switches between the different sets of precoders).

The one or more quality threshold values may be a function of one or more channel conditions of the multiple-input channel, e.g. a delay spread, a spatial correlation, an angular spread, etc. Moreover, the one or more quality threshold values may depend on the number of antenna elements at the transmitting device 100 for the transmission 206 (e.g., the array size) and/or a configuration at the transmitting device 100 (e.g., a gNB). Preferably, responsive to a change in the channel conditions of the multiple-input channel, the one or more quality threshold values are updated, e.g., by pre-computing the one or more quality threshold values using one of the above three pre-computations.

Figure 8:
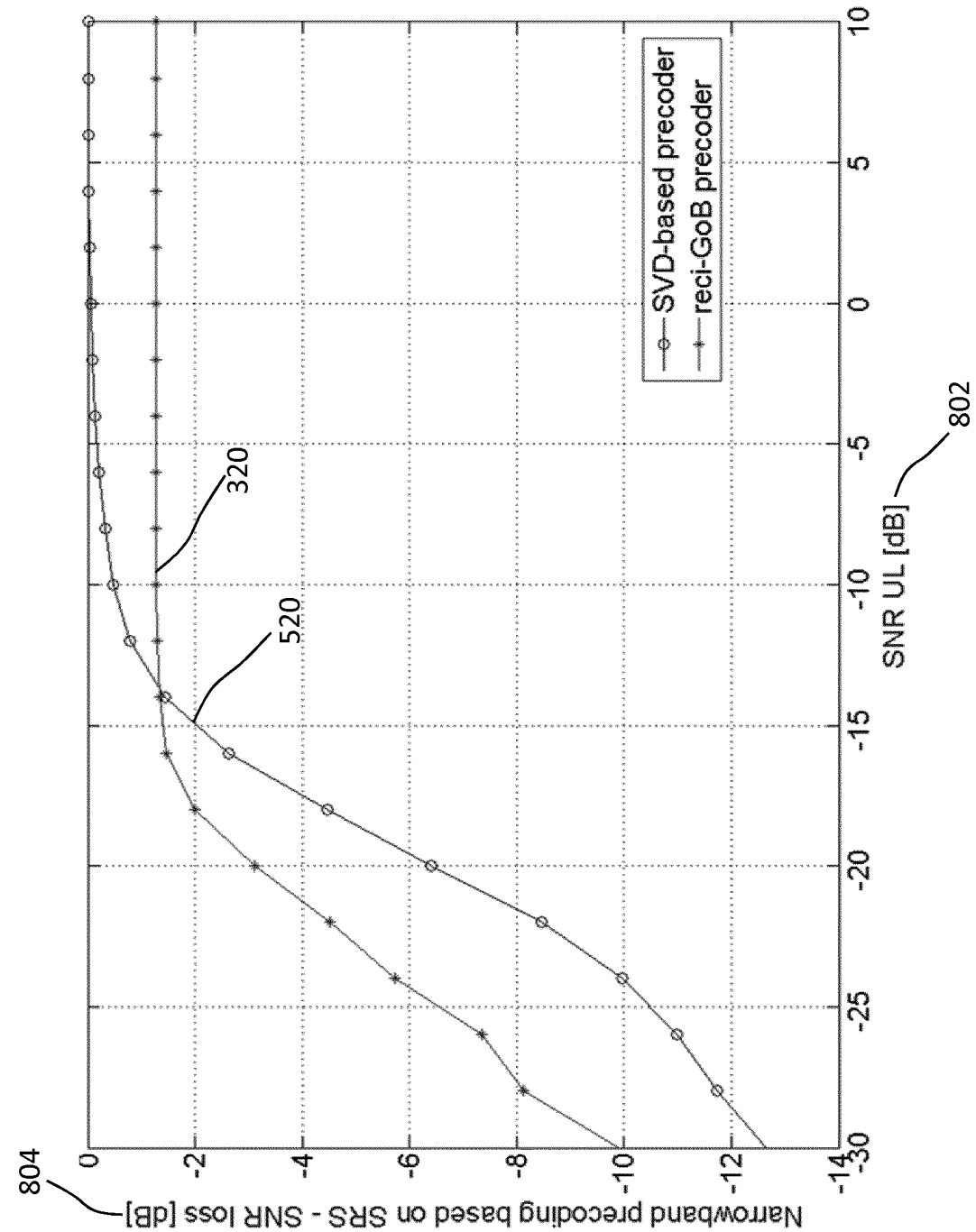
FIG. 8 schematically illustrates a gain achievable by an embodiment of the device of FIG. 1.

FIG. 8 shows a diagram including two curves 320 and 520 for the performance 804 of respective first and second sets of precoders, i.e., respective two precoding schemes, namely reci-GoB precoding and SVD-based precoding in the example of FIG. 8. The performance curves are a function of the radio quality measure 802, namely the SNR in the UL in the example of FIG. 8. That is, FIG. 8 schematically illustrates a comparison between the performance of a reci-GoB precoding scheme and a SVD-based precoding scheme as a function of uplink SNR, e.g., for one scenario.

The intersection of the two curves of the performance when using correspond one of the two different sets of precoders may define the quality threshold value for switching between the two sets.

Herein, the "quality threshold value" or any one of the "one or more quality threshold values" may be an example of the first quality threshold value or—for a hysteric implementation of switching between the sets—an example of the second quality threshold value.

The first set of precoders available for the reci-GoB underlying the performance curve 320 may be the GoB or any basis set 300. The second set of precoders available for the SVD-based precoding underlying the performance curve 520 may be the set 500.

FIG. 8 illustrates the effectiveness of an implementation of the method 200 in a numerical simulation of the multiple-input channel. The performance curves 320 and 520 show the performance loss of the reci-GoB precoding and SVD-based precoding, respectively, in comparison to an ideal precoder that knows the true channel, as a function of UL SNR 802. As can be observed from the diagram in FIG. 8, using the second set (i.e., the SVD-based precoding) reaches asymptotically the performance of the ideal precoder at high values of the SNR 802. Using the first set (i.e., the reci-GoB precoding) outperforms the SVD-based precoding at low values of the SNR 802, i.e., below the quality threshold value.

Independent of details of the two precoding schemes and the radio quality measure, the diagram in FIG. 8 illustrates a general principle of defining the sets, one of which is selectively used for the spatial precoding in the step 206 depending on the determined quality. At a low quality (i.e., when the determined quality is less than the quality threshold value), using the first set that is a proper subset of the second set (i.e., the channel-structure-constrained beamforming) outperforms using the second set (i.e., the channelstructure-unconstrained beamforming). This is vice versa at a high quality (i.e., when the determined quality is greater than the quality threshold value). In other words, the set of precoders is adaptively selected to optimize the precoding scheme in different ranges of the quality of the channel estimate (e.g., different ranges of the radio quality measure such as SNR ranges), wherein the size of the set of precoders is an increasing or non-decreasing function of the determined quality.

When the determined quality of the channel estimate falls below the quality threshold value, the set of precoders is switched from the second set to the first set. Optionally, the control mechanism determining the precoder out of the set is also switched at the quality threshold value.

Furthermore, the quality threshold value is a function of the physical channel characteristics. More specifically, simulations show that when the delay spread decreases, the threshold decreases accordingly. For examples, for a delay spread equal to 300 ns, the quality threshold value may be about −15 dB. The quality threshold value decreases to about −20 dB, if the delay spread decreases to 30 ns.

Moreover, responsive to a change in the level of spatial correlation, the transmitting device 100 may (e.g., slightly) adjust the quality threshold value. For example, for a high level of spatial correlation, the quality threshold value may be −15 dB, while for a medium level of correlation, the quality threshold value may be −17 dB.

Figure 9:
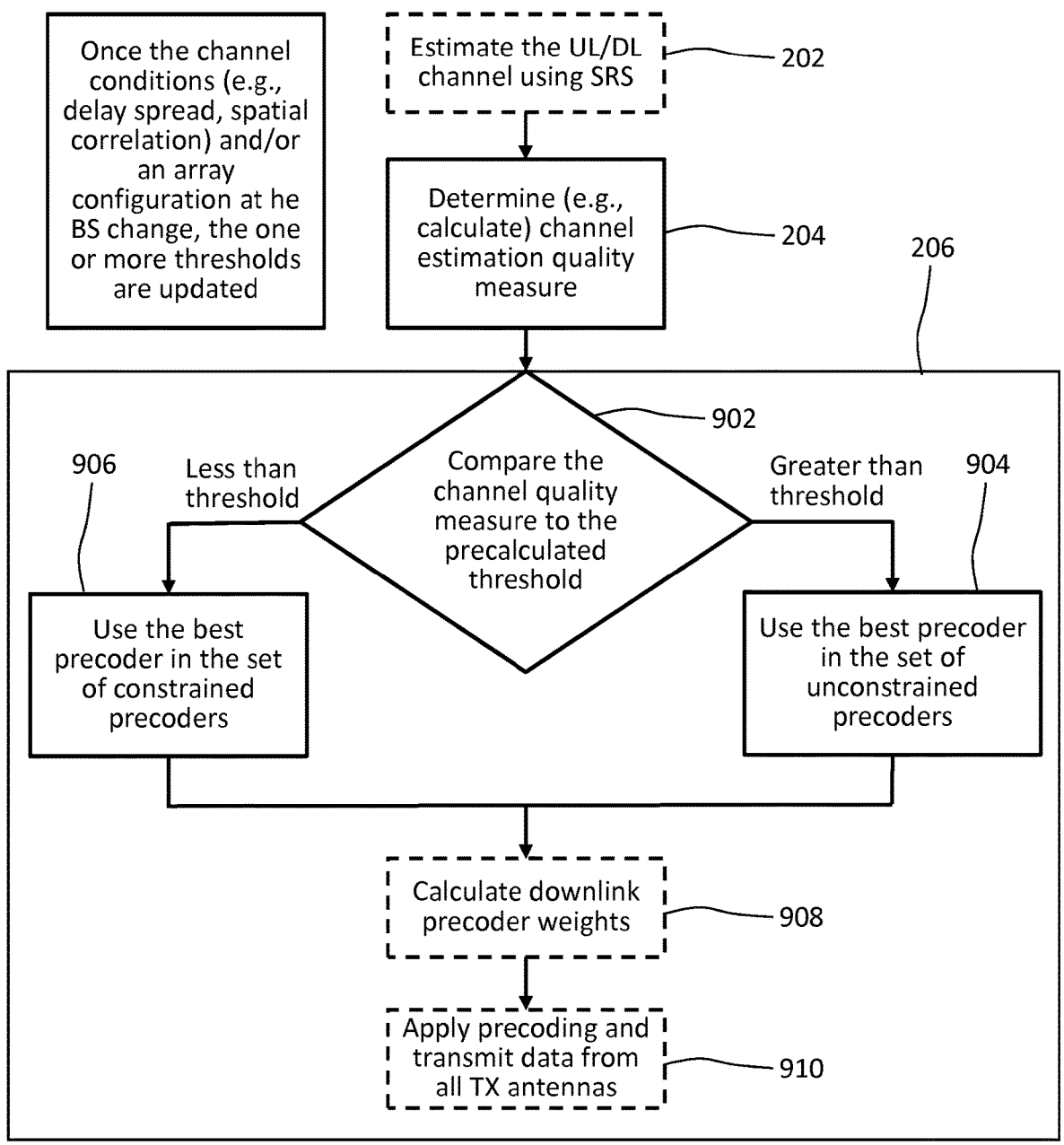
FIG. 9 shows a flowchart of an exemplary implementation of the method of FIG. 2.

FIG. 9 shows a schematic flow chart for an implementation of the method 200 performed by the transmitting device 100 (e.g., the base station or a multi-user transmitter). Processing steps to implement the adaptive DL precoding, i.e., the adaptive set of precoders depending on the quality of the channel estimate.

In the optional step 202, the channel estimate is determined using SR received from the respective receiving device and channel reciprocity. In the step 204, the quality of the channel estimate is determined, e.g., by measuring the radio quality.

The transmission 206 comprises a substep 902 of comparing the determined quality with at least one (e.g., pre-calculated and/or responsive to a change in channel condition adapted) quality threshold values. Depending on a result of the comparison 902, the best precoder for the channel estimate is determined in substeps 906 and 904, respectively, out of the first set (e.g., a set with constraints or a set of constrained precoders) if the quality is less than the threshold or the second set (e.g., a set with less constraints or a set of unconstrained precoders) if the quality is greater than the threshold.

The weight (e.g., a complex-valued gain) for each of the multiple inputs (e.g., antenna ports or antenna elements) are computed according to the determined precoder in a substep 908 and applied in a substep 910 for the transmission 206.

Figure 10:
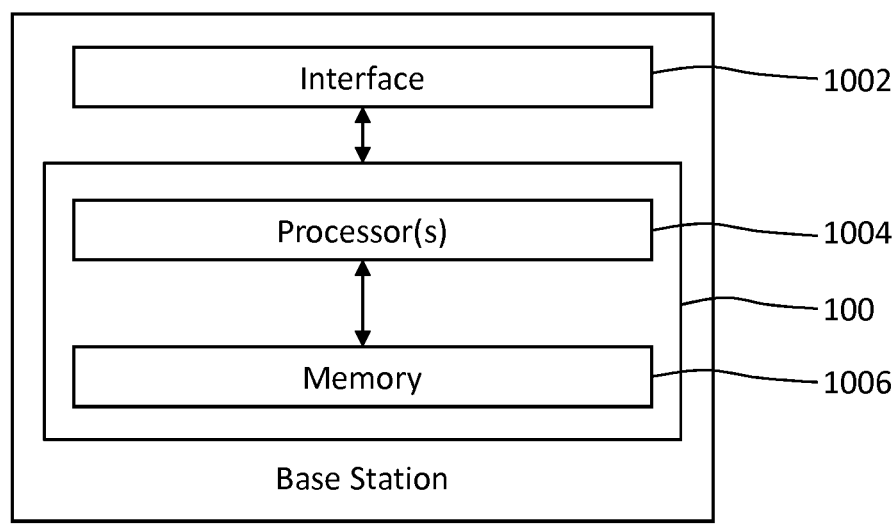
FIG. 10 shows a schematic block diagram of a transmitting device embodying the device of FIG. 1.

FIG. 10 shows a schematic block diagram for an embodiment of the device 100. The device 100 comprises one or more processors 1004 for performing the method 300 and memory 1006 coupled to the processors 1004. For example, the memory 1006 may be encoded with instructions that implement at least one of the modules 102, 104 and 106.

The one or more processors 1004 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 1006, transmitter functionality. For example, the one or more processors 1004 may execute instructions stored in the memory 1006. Such functionality may include providing various features and steps discussed herein, including any of the benefits disclosed herein. The expression "the device being operative to perform an action" may denote the device 100 being configured to perform the action.

As schematically illustrated in FIG. 10, the device 100 may be embodied by a transmitting station 1000, e.g., functioning as a transmitting base station or a transmitting UE. The transmitting station 1000 comprises a radio interface 1002 coupled to the device 100 for radio communication with one or more receiving stations, e.g., functioning as a receiving base station or a receiving UE.

Figure 11:
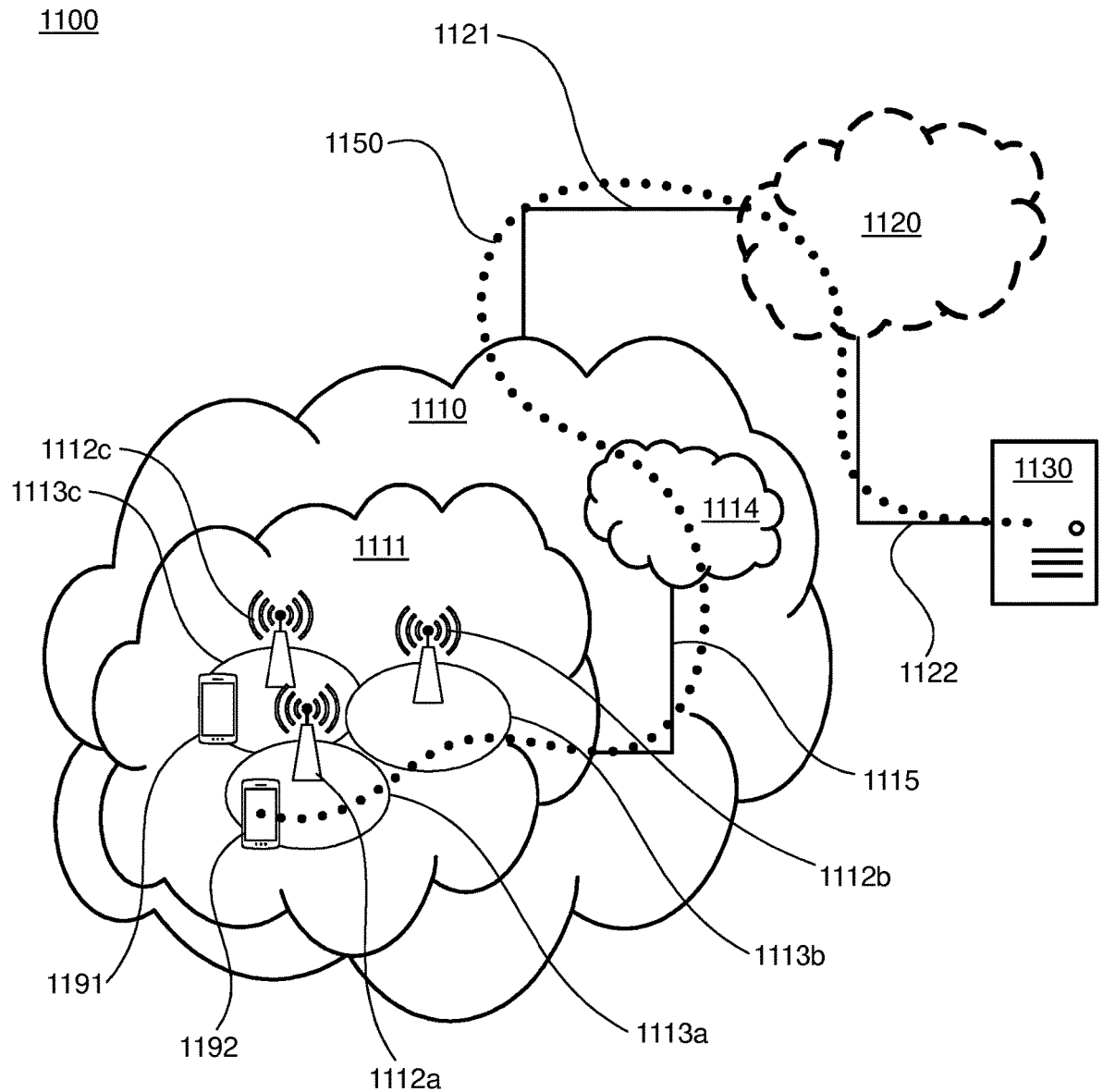
FIG. 11 schematically illustrates an exemplary telecommunication network connected via an intermediate network to a host computer.

With reference to FIG. 11, in accordance with an embodiment, a communication system 1100 includes a telecommunication network 1110, such as a 3GPP-type cellular network, which comprises an access network 1111, such as a radio access network, and a core network 1114. The access network 1111 comprises a plurality of base stations 1112a, 1112b, 1112c, such as NBs, eNBs, gNBs or other types of wireless access points, each defining a corresponding coverage area 1113a, 1113b, 1113c. Each base station 1112a, 1112b, 1112c is connectable to the core network 1114 over a wired or wireless connection 1115. A first UE 1191 located in coverage area 1113c is configured to wirelessly connect to, or be paged by, the corresponding base station 1112c. A second UE 1192 in coverage area 1113a is wirelessly connectable to the corresponding base station 1112a. While a plurality of UEs 1191, 1192 are illustrated in this example, the disclosed embodiments are equally applicable to a situation where a sole UE is in the coverage area or where a sole UE is connecting to the corresponding base station 1112.

Any of the base stations 1112 and the UEs 1191, 1192 may embody the device 100.

The telecommunication network 1110 is itself connected to a host computer 1130, which may be embodied in the hardware and/or software of a standalone server, a cloud-implemented server, a distributed server or as processing resources in a server farm. The host computer 1130 may be under the ownership or control of a service provider, or may be operated by the service provider or on behalf of the service provider. The connections 1121, 1122 between the telecommunication network 1110 and the host computer 1130 may extend directly from the core network 1114 to the host computer 1130 or may go via an optional intermediate network 1120. The intermediate network 1120 may be one of, or a combination of more than one of, a public, private or hosted network; the intermediate network 1120, if any, may be a backbone network or the Internet; in particular, the intermediate network 1120 may comprise two or more sub-networks (not shown).

The communication system 1100 of FIG. 11 as a whole enables connectivity between one of the connected UEs 1191, 1192 and the host computer 1130. The connectivity may be described as an over-the-top (OTT) connection 1150. The host computer 1130 and the connected UEs 1191, 1192 are configured to communicate data and/or signaling via the OTT connection 1150, using the access network 1111, the core network 1114, any intermediate network 1120 and possible further infrastructure (not shown) as intermediaries. The OTT connection 1150 may be transparent in the sense that the participating communication devices through which the OTT connection 1150 passes are unaware of routing of uplink and downlink communications. For example, a base station 1112 need not be informed about the past routing of an incoming downlink communication with data originating from a host computer 1130 to be forwarded (e.g., handed over) to a connected UE 1191. Similarly, the base station 1112 need not be aware of the future routing of an outgoing uplink communication originating from the UE 1191 towards the host computer 1130.

By virtue of the method 200 performed by any one of the base stations 1112, the performance of the OTT connection 1150 can be improved, e.g., in terms of increased throughput, reduced latency and/or increased reliability. Optionally, the host computer 1130 may indicate the set of precoders to be used for transmitting the user data.

Example implementations, in accordance with an embodiment of the UE, base station and host computer discussed in the preceding paragraphs, will now be described with reference to FIG. 12. In a communication system 1200, a host computer 1210 comprises hardware 1215 including a communication interface 1216 configured to set up and maintain a wired or wireless connection with an interface of a different communication device of the communication system 1200. The host computer 1210 further comprises processing circuitry 1218, which may have storage and/or processing capabilities. In particular, the processing circuitry 1218 may comprise one or more programmable processors, application-specific integrated circuits, field programmable gate arrays or combinations of these (not shown) adapted to execute instructions. The host computer 1210 further comprises software 1211, which is stored in or accessible by the host computer 1210 and executable by the processing circuitry 1218. The software 1211 includes a host application 1212. The host application 1212 may be operable to provide a service to a remote user, such as a UE 1230 connecting via an OTT connection 1250 terminating at the UE 1230 and the host computer 1210. In providing the service to the remote user, the host application 1212 may provide user data, which is transmitted using the OTT connection 1250. The user data may depend on the location of the UE 1230. The user data may comprise auxiliary information or precision advertisements (also: ads) delivered to the UE 1230. The location may be reported by the UE 1230 to the host computer, e.g., using the OTT connection 1250, and/or by the base station 1220, e.g., using a connection 1260.

The communication system 1200 further includes a base station 1220 provided in a telecommunication system and comprising hardware 1225 enabling it to communicate with the host computer 1210 and with the UE 1230. The hardware 1225 may include a communication interface 1226 for setting up and maintaining a wired or wireless connection with an interface of a different communication device of the communication system 1200, as well as a radio interface 1227 for setting up and maintaining at least a wireless connection 1270 with a UE 1230 located in a coverage area (not shown in FIG. 12) served by the base station 1220. The communication interface 1226 may be configured to facilitate a connection 1260 to the host computer 1210. The connection 1260 may be direct, or it may pass through a core network (not shown in FIG. 12) of the telecommunication system and/or through one or more intermediate networks outside the telecommunication system. In the embodiment shown, the hardware 1225 of the base station 1220 further includes processing circuitry 1228, which may comprise one or more programmable processors, application-specific integrated circuits, field programmable gate arrays or combinations of these (not shown) adapted to execute instructions. The base station 1220 further has software 1221 stored internally or accessible via an external connection.

The communication system 1200 further includes the UE 1230 already referred to. Its hardware 1235 may include a radio interface 1237 configured to set up and maintain a wireless connection 1270 with a base station serving a coverage area in which the UE 1230 is currently located. The hardware 1235 of the UE 1230 further includes processing circuitry 1238, which may comprise one or more programmable processors, application-specific integrated circuits, field programmable gate arrays or combinations of these (not shown) adapted to execute instructions. The UE 1230 further comprises software 1231, which is stored in or accessible by the UE 1230 and executable by the processing circuitry 1238. The software 1231 includes a client application 1232. The client application 1232 may be operable to provide a service to a human or non-human user via the UE 1230, with the support of the host computer 1210. In the host computer 1210, an executing host application 1212 may communicate with the executing client application 1232 via the OTT connection 1250 terminating at the UE 1230 and the host computer 1210. In providing the service to the user, the client application 1232 may receive request data from the host application 1212 and provide user data in response to the request data. The OTT connection 1250 may transfer both the request data and the user data. The client application 1232 may interact with the user to generate the user data that it provides.

Figure 12:
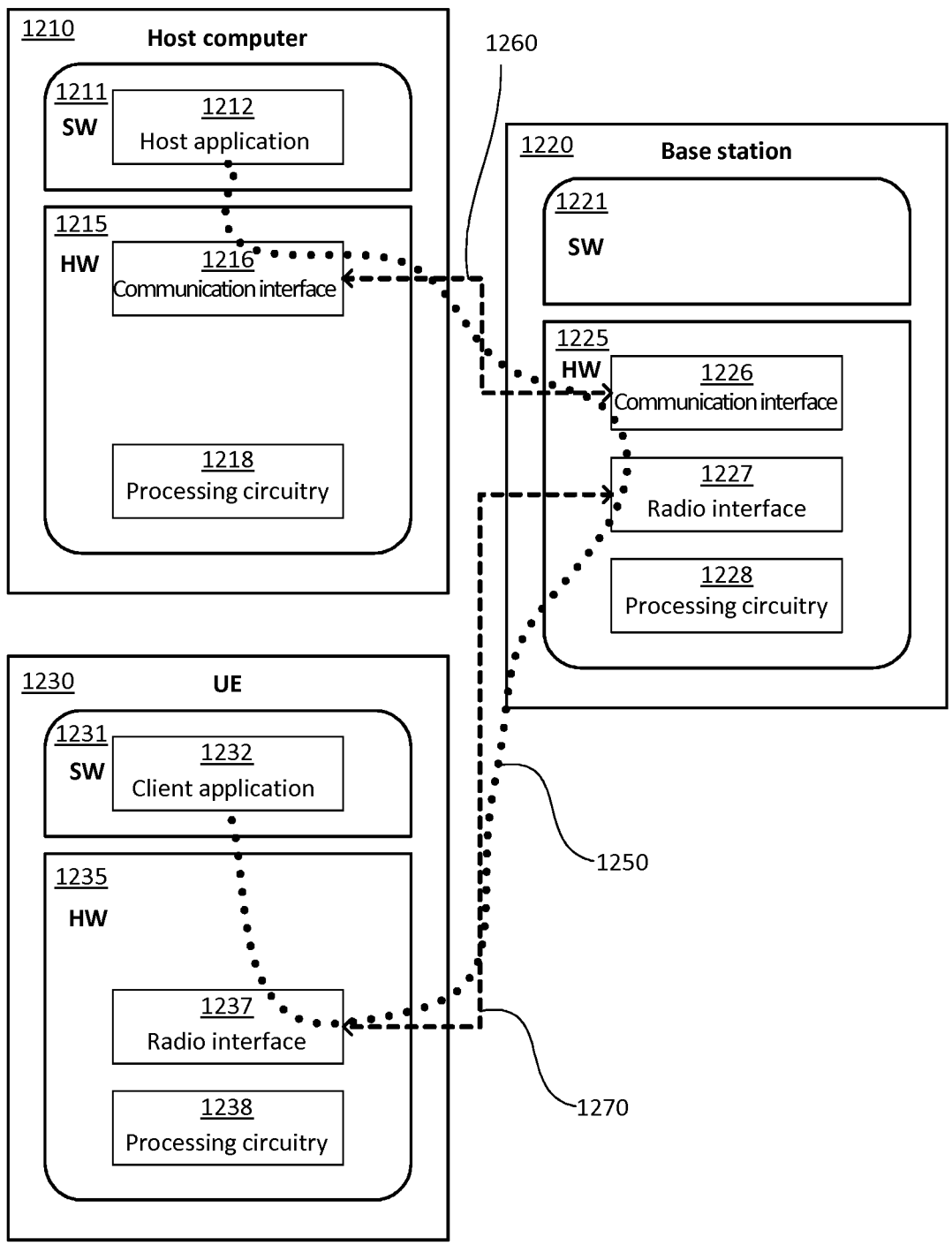
FIG. 12 shows a generalized block diagram of an exemplary host computer communicating via a base station or radio device functioning as a gateway with a user equipment over a partially wireless connection.

It is noted that the host computer 1210, base station 1220 and UE 1230 illustrated in FIG. 12 may be identical to the host computer 1130, one of the base stations 1112a, 1112b, 1112c and one of the UEs 1191, 1192 of FIG. 11, respectively. This is to say, the inner workings of these entities may be as shown in FIG. 12, and, independently, the surrounding network topology may be that of FIG. 11.

In FIG. 12, the OTT connection 1250 has been drawn abstractly to illustrate the communication between the host computer 1210 and the UE 1230 via the base station 1220, without explicit reference to any intermediary devices and the precise routing of messages via these devices. Network infrastructure may determine the routing, which it may be configured to hide from the UE 1230 or from the service provider operating the host computer 1210, or both. While the OTT connection 1250 is active, the network infrastructure may further take decisions by which it dynamically changes the routing (e.g., on the basis of load balancing consideration or reconfiguration of the network).

The wireless connection 1270 between the UE 1230 and the base station 1220 is in accordance with the teachings of the embodiments described throughout this disclosure. One or more of the various embodiments improve the performance of OTT services provided to the UE 1230 using the OTT connection 1250, in which the wireless connection 1270 forms the last segment. More precisely, the teachings of these embodiments may reduce the latency and improve the data rate and thereby provide benefits such as better responsiveness and improved QoS.

A measurement procedure may be provided for the purpose of monitoring data rate, latency, QoS and other factors on which the one or more embodiments improve. There may further be an optional network functionality for reconfiguring the OTT connection 1250 between the host computer 1210 and UE 1230, in response to variations in the measurement results. The measurement procedure and/or the network functionality for reconfiguring the OTT connection 1250 may be implemented in the software 1211 of the host computer 1210 or in the software 1231 of the UE 1230, or both. In embodiments, sensors (not shown) may be deployed in or in association with communication devices through which the OTT connection 1250 passes; the sensors may participate in the measurement procedure by supplying values of the monitored quantities exemplified above, or supplying values of other physical quantities from which software 1211, 1231 may compute or estimate the monitored quantities. The reconfiguring of the OTT connection 1250 may include message format, retransmission settings, preferred routing etc.; the reconfiguring need not affect the base station 1220, and it may be unknown or imperceptible to the base station 1220. Such procedures and functionalities may be known and practiced in the art. In certain embodiments, measurements may involve proprietary UE signaling facilitating the host computer's 1210 measurements of throughput, propagation times, latency and the like. The measurements may be implemented in that the software 1211, 1231 causes messages to be transmitted, in particular empty or "dummy" messages, using the OTT connection 1250 while it monitors propagation times, errors etc.

FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this paragraph. In a first step 1310 of the method, the host computer provides user data. In an optional substep 1311 of the first step 1310, the host computer provides the user data by executing a host application. In a second step 1320, the host computer initiates a transmission carrying the user data to the UE. In an optional third step 1330, the base station transmits to the UE the user data which was carried in the transmission that the host computer initiated, in accordance with the teachings of the embodiments described throughout this disclosure. In an optional fourth step 1340, the UE executes a client application associated with the host application executed by the host computer.

FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 15 will be included in this paragraph. In a first step 1410 of the method, the host computer provides user data. In an optional substep (not shown) the host computer provides the user data by executing a host application. In a second step 1420, the host computer initiates a transmission carrying the user data to the UE. The transmission may pass via the base station, in accordance with the teachings of the embodiments described throughout this disclosure. In an optional third step 1430, the UE receives the user data carried in the transmission.

Any embodiment of the transmitting device 100 and any implementation of the method 200 may select a (e.g., DL) precoding scheme (e.g., a beamforming scheme) with a correspond set of precoders (e.g., beams) for spatial precoding using channel reciprocity. The channel reciprocity may be used on the level of a channel transfer function or a DoA.

While the precoder within the set is determined by a control mechanism based on the channel estimate, the set of precoders is determined by comparing the quality of the channel estimate, e.g., a radio quality measure (e.g., at least UL measurements) indicating the link quality against a quality threshold value. The radio quality measure may comprise an UL quality metric as a measure of the UL, e.g., the SINR per antenna element.

The quality threshold value may be set (e.g., pre-computed) at a level, at which the different sets of precoders (i.e., the different precoding schemes) have similar performance in the transmission 206. The quality threshold value may be pre-computed to be at a level of the quality (e.g., at the lowest level) enabling a stable non-constrained channel estimation. The quality threshold value may depend on channel characteristics, e.g., delay spread and angular spread. By way of example, the quality threshold value in terms of a SNR at the transmitting device 100 may be equal to or on the order of −15 dB.

As has become apparent from above description, embodiments of the technique can enable spatial precoding using an optimal precoding scheme, i.e., using an optimal set of available precoders for the spatial precoding, which has the best receiver SINR among the set of precoders as the quality of the channel estimate changes. The technique can increase the range of channel states with reliable spatial precoding. The quality of the channel estimate may change as a location and/or a movement of the receiving device (e.g., a UE) changes and/or environment conditions changes. For example, adaptive to a signal strength measured at the receiving device and reported to the transmitting device, the set of precoders (i.e., the precoding scheme) is selected so that the SINR at the receiving device is maximized.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A method of transmitting on a multiple-input channel from a transmitting device to at least one receiving device, the method comprising or initiating the steps of:
    determining a quality of a channel estimate of the multiple-input channel from the transmitting device to the at least one receiving device; and
    transmitting on the multiple-input channel from the transmitting device to the at least one receiving device, wherein the transmission is spatially precoded using at least one precoder determined out of a set of precoders, wherein a size of the set of precoders is an increasing or non-decreasing function of the determined quality of the channel estimate;
    wherein the set is a first set if the determined quality is less than a first quality threshold value, and the set is a second set if the determined quality is greater than the first quality threshold value, and wherein the first set is a proper subset of the second set, and wherein the second set is the superset and the first set is the proper subset of the second set resulting from restricting the second set according to a constraint depending on the determined quality of the channel estimate.

2. The method of claim 1, wherein the transmission uses first and second frequency bands, first and second resource blocks, or first and second subcarriers, and wherein the constraint is applied to the first frequency band, the first resource block, or the first subcarrier, while the precoder used for the second frequency band, the second resource block or the second subcarrier is determined independent of the quality of the channel estimate.

3. The method of claim 1, wherein the constraint comprises a frequency-selectivity that is a function of the determined quality of the channel estimate and/or wherein the set is frequency-selective depending on the determined quality of the channel estimate.

4. The method of claim 1, wherein the constraint comprises a relation or a correlation between precoders determined or available for the determination in different frequency bands, in different resource blocks, or in different subcarriers.

5. The method of claim 1, wherein each of the precoders in the set defines complex gains for respective multiple inputs of the multiple-input channel, and wherein the constraint restricts the complex gains to an equal amplitude.

6. The method of claim 1, further comprising or initiating at least one of the steps of:
switching the set from the second set to the first set when the determined quality falls below the first quality threshold value; and
switching the set from the first set to the second set when the determined quality exceeds the first quality threshold value or the second quality threshold value.

7. The method of claim 1, wherein the switching comprises switching between a first control mechanism and second control mechanism for determining the at least one precoder out of the first and second sets of precoders, respectively.

8. The method of claim 1, wherein each of the precoders in the first set is normalized, and/or wherein all of the precoders in the first set are mutually orthogonal.

9. The method of claim 1, wherein the first set comprises a grid of beams (GoB) and wherein a first control mechanism for determining the at least one precoder out of the first set of precoders determines the at least one precoder that matches a direction of arrival (DoA) measured for signals from the respective receiving device.

10. The method of claim 1, wherein the second set comprises linear combinations of the precoders in the first set.

11. The method of claim 1, wherein the at least one precoder is determined out of the second set using at least one of a singular value decomposition (SVD) of the channel estimate and a minimum mean square error (MMSE) of the channel estimate.

12. The method of claim 1, wherein the first quality threshold value depends on at least one of channel conditions of the multiple-input channel, delay spread of the multiple-input channel, spatial correlation of the multiple-input channel and an angular spread of the multiple-input channel.

13. The method of claim 1, wherein the first quality threshold value is independent of a number of the multiple inputs or the multiple-input channel, particularly independent of a number of antenna elements used for the transmission.

14. The method of claim 1, further comprising or initiating the step of:
computing the first quality threshold value as a crossover point or intersection between a first performance and a second performance achieved using the first set of precoders and the second set of precoders, respectively, for the spatial precoding on the multiple-input channel as a function of the quality of the channel estimate, particularly a radio quality.

15. The method of claim 14, wherein the first and second performances comprise at least one of a channel capacity, a precoding processing gain and a performance loss achieved by the spatial precoding on the multiple-input channel as a function of the quality of the channel estimate, particularly a radio quality.

16. The method of claim 1, wherein the quality of the channel estimate is determined based on a report from each of the at least one receiving device, the report being indicative of at least one of the quality of the channel estimate of the multiple-input channel to the respective receiving device and a result of measurements of the radio quality at the respective receiving device.

17. The method of claim 1, further comprising or initiating the step of:
determining the at least one precoder for the transmission out of the set, wherein the at least one precoder is determined out of the set depending on the channel estimate, and wherein the channel estimate of the multiple-input channel comprises at least one of a transfer function of the multiple-input channel and a direction of arrival (DoA) at the transmitting device.

18. A device for transmitting on a multiple-input channel from a transmitting device to at least one receiving device, the device comprising at least one processor and a memory, said memory comprising instructions executable by said at least one processor, whereby the device is operative to:
determine a quality of a channel estimate of the multiple-input channel from the transmitting device to the at least one receiving device; and
transmit on the multiple-input channel from the transmitting device to the at least one receiving device, wherein the transmission is spatially precoded using at least one precoder determined out of a set of precoders, wherein a size of the set of precoders is an increasing or non-decreasing function of the determined quality of the channel estimate;
wherein the set is a first set if the determined quality is less than a first quality threshold value, and the set is a second set if the determined quality is greater than the first quality threshold value, and wherein the first set is a proper subset of the second set, and wherein the second set is the superset and the first set is the proper subset of the second set resulting from restricting the second set according to a constraint depending on the determined quality of the channel estimate.

19. A method of transmitting on a multiple-input channel from a transmitting device to at least one receiving device, the method comprising or initiating the steps of:
determining a quality of a channel estimate of the multiple-input channel from the transmitting device to the at least one receiving device; and
transmitting on the multiple-input channel from the transmitting device to the at least one receiving device, wherein the transmission is spatially precoded using at least one precoder determined out of a set of precoders, wherein a size of the set of precoders is an increasing or non-decreasing function of the determined quality of the channel estimate;
wherein the set results from selectively restricting a superset of precoders according to a constraint depending on the determined quality of the channel estimate, wherein each of the precoders in the set defines complex gains for respective multiple inputs of the multiple-input channel, and wherein the constraint restricts the complex gains to an equal amplitude.

* * * * *